(12) United States Patent
Maruyama et al.

(10) Patent No.: US 6,522,247 B2
(45) Date of Patent: Feb. 18, 2003

(54) APPARATUS MONITORING SYSTEM AND APPARATUS MONITORING METHOD

(75) Inventors: Shiro Maruyama, Yokohama (JP); Takaaki Sakakibara, Yokohama (JP); Kyoichi Uehara, Tokyo (JP); Masayuki Akazaki, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 42 days.

(21) Appl. No.: 09/861,725

(22) Filed: May 22, 2001

(65) Prior Publication Data

US 2001/0048375 A1 Dec. 6, 2001

(30) Foreign Application Priority Data

May 23, 2000 (JP) .................................... 2000-151431

(51) Int. Cl.[7] .............................................. G08B 29/00
(52) U.S. Cl. ..................................................... 340/506
(58) Field of Search ................................ 340/506, 511, 340/517, 521, 531, 533, 679, 3.1, 825.36, 825.49; 375/222; 128/904

(56) References Cited

U.S. PATENT DOCUMENTS

| | | | | |
|---|---|---|---|---|
| 4,273,960 A | * | 6/1981 | Fahey et al. ................... 379/38 |
| 4,278,975 A | * | 7/1981 | Kimura et al. ................. 342/43 |
| 5,749,374 A | * | 5/1998 | Schneider .................... 128/870 |
| 5,832,194 A | * | 11/1998 | Braun et al. .................... 714/1 |
| 5,931,791 A | * | 8/1999 | Saltzstein et al. ............. 600/513 |
| 5,946,348 A | * | 8/1999 | Mizutani et al. .............. 375/222 |
| 6,038,252 A | * | 3/2000 | Mizutani et al. .............. 375/222 |
| 6,044,321 A | * | 3/2000 | Nakamura et al. ............. 701/96 |
| 6,128,284 A | * | 10/2000 | Kawamura et al. .......... 370/241 |
| 6,148,148 A | * | 11/2000 | Wain et al. ...................... 396/2 |

FOREIGN PATENT DOCUMENTS

| | | |
|---|---|---|
| JP | 64-14832 | 1/1989 |
| JP | 8-21280 | 3/1996 |
| JP | 11-341706 | 12/1999 |

* cited by examiner

*Primary Examiner*—Daryl Pope
(74) *Attorney, Agent, or Firm*—Oblon, Spivak, McClelland, Maier & Neustadt, P.C.

(57) ABSTRACT

A data acquisition and transmitting unit samples the signal indicating the apparatus state quantity from a sensor provided on an apparatus, converts the signal into absolute-time-tagged monitoring data S(t), stores the data S(t), and transmits the data S(t) to a network. A digital protection and control unit takes in the quantity data E about the system of the apparatus and the operating state data P about the apparatus, converts these data into absolute-time-tagged data E(t) and operating state data P(t), stores these converted data, and transmits these data E(t) and P(t) to the network. A data display unit receives the data S(t), E(t), and P(t) from the data acquisition and transmitting unit and digital protective and control unit via the network and displays the state of the apparatus on the basis of the data S(t), E(t), and P(t).

17 Claims, 17 Drawing Sheets

APPARATUS MONITORING SYSTEM AND APPARATUS MONITORING METHOD

CROSS-REFERENCE TO RELATED APPLICATIONS

This application is based upon and claims the benefit of priority from the prior Japanese Patent Application No. 2000-151431, filed May 23, 2000, the entire contents of which are incorporated herein by reference.

BACKGROUND OF THE INVENTION

This invention relates to a monitoring system for apparatuses in an electric power installation, such as generating stations, substations, or switchyards, and a method of monitoring such apparatuses.

In a substation, there are generally provided power apparatuses. These include power switching modules for connecting/disconnecting high-voltage main circuits, such as gas insulated switchgear, transformers, and reactors. These apparatuses are required to improve reliability, reduce the frequency of maintenance, prevent a failure from occurring, and take measures at an early stage in case of a failure. To meet these requirements, monitoring systems for power apparatuses have been proposed.

FIG. 1 shows a conventional apparatus monitoring system. In the apparatus monitoring system, various physical characteristics and chemical characteristics related to apparatus condition are measured by a variety of sensors 41. The output signals from the sensors 41 are processed by a number of measuring sections 42, which convert the signals into measurement data. Thereafter, the measurement data is gathered by an acquisition unit 43 and then displayed on a data display unit 44.

The measurement data acquisition unit 43 and data display unit 44 are located in.the main building of the electric power installation. When data indicating an abnormality in an apparatus has been measured, the indication of the abnormality is displayed as data on the data display unit 44 in the main building of the electric power installation. The data on the display unit enables the user to recognize the abnormality. Furthermore, when data indicating an abnormality in an apparatus has been measured, data items concerning the abnormality are gathered together. The gathered information is transmitted in the form of summarized data about the switchgear to the monitoring unit 45. This monitoring unit 45 then reports the information to a higher-order control station in a distant place.

The data measured by the apparatus monitoring system, together with time data supplied from a local clock module in the apparatus monitoring system, is stored in the measured data acquisition unit 43.

In an apparatus monitoring system that monitors, for example, the gas-insulated switchgear in a substation, the instantaneous value measurement data items include gas pressure, partial discharge, oil pressure, and the operating time of a switch. The accumulated measurement data includes the contact wear.

A device for measuring the contact wear of a switch has been disclosed in Jpn. Pat. Appln. KOKOU Publication No. PH08-021280 which corresponds to Jpn. Pat. Appln. KOKAI Publication PH64-014832. The device is based on the fact that the wear of the contact of a circuit breaker is determined by the value of the current that is interrupted.

The conventional apparatus monitoring system of FIG. 1, however, has the following problems.

The first problem is that, although the measured data can be checked on the data display unit installed in the main building of an electric power installation, only limited information about the occurrence of the abnormality is transmitted to the central control station for controlling the operation of apparatuses.

Therefore, when an abnormality has occurred in an apparatus in an electric power installation and the abnormality has been sensed, checking detailed information about the abnormality requires maintenance personnel to go to the site and check the data displayed on the data display unit 44 in the main building. This increases the burden on the maintenance personnel, causes a delay in taking measures in case of a failure, impairs the operation of the apparatus, and degrade the efficiency of the facilities.

The second problem concerns time-tagging of data.

In the conventional apparatus monitoring system, for time-tagging of the measured data, the time of the local clock device included in the apparatus monitoring system is used. The time data from such a local clock device is inaccurate and the apparatus monitoring system is not synchronized with other systems, including protection and control systems.

Consequently, it is impossible to analyze changes in the state of the apparatus accurately with respect to time. This makes it difficult to determine accurately expected restoring time when the apparatus has malfunctioned. The data measured by the apparatus monitoring system cannot be checked time-sequentially against the data measured by another system, which makes it impossible to use the former data as analysis data when an abnormality has been sensed.

Furthermore, the conventional apparatus monitoring system is based on the state of the system and is independent of the systems, which protect and control the operation of the apparatus.

Therefore, when the data related to the service life is measured from data about the operating state quantity of the apparatus as is the case for contact wear quantity of the breaker, it is necessary to provide the apparatus monitoring system with a separate sensor for taking in data about the operating state quantity of the apparatus. This makes the system redundant and more complex and impairs the economy of the system.

BRIEF SUMMARY OF THE INVENTION

A first object of the present invention is to provide a highly economical, high-performance apparatus monitoring system for equipment installed in an electric power installation. The invention improves the function of the system by making it easier to check the condition monitoring data at a remote place, thereby helping save labor, take measures more easily and quickly in case of a failure, and improve the operation of the apparatus and system and further the economy of the whole system.

Another object of the present invention is to provide a higher-performance apparatus monitoring system which improves the function of the system by making it possible to compare the condition monitoring data obtained in the system with the data measured by another system in the same time sequence. This will improve the data management, thereby helping take measures much more easily and quickly in case of a failure.

Another third object of the present invention is to provide a more economical and higher-performance apparatus monitoring system which not only simplifies the system as much as possible but also makes a sophisticated judgment on the state of the apparatus on the basis of the data from another system.

Another goal of the present invention is to provide a business model for an apparatus monitoring method capable of monitoring apparatuses installed in the user's electric power installation, creating some useful consulting data from the monitoring data at the time of maintenance or inspection or in case of a failure, and providing the user with the consulting data.

According to the present invention, there is provided an apparatus monitoring system, which monitors an apparatus installed in an electric power installation and is connected to a communication network. This apparatus monitoring system comprises: sensors which are provided on an apparatus; a data acquisition and transmitting unit including conversion means which samples the signals from the sensors and converts the sampled signals into absolute-time-tagged digital monitoring data and transmission means for transmitting the digital monitoring data to the communication network; and a data display unit which receives the digital data from the data acquisition and transmitting unit via the communication network, converts the digital data into display data, and displays these data.

With such an apparatus monitoring system, the condition monitoring data obtained by the data acquisition and transmitting unit or the data related to the state of the monitored apparatus created on the basis of the condition monitoring data, can be checked from anywhere with the data display unit connected via the network. Therefore, maintenance personnel can check the condition monitoring data easily from a remote place, such as a control station, without going to the site, thus improving the functioning of the system. This not only helps save labor in apparatus maintenance and take action more easily and quickly in case of a failure, but also improves the operation of the apparatus and system. Furthermore, since the absolute time is tagged to the data obtained by the data acquisition and transmitting unit, an accurate analysis of changes in the apparatus state with respect to time makes it possible to display accurately the time that measures have to be taken after an abnormality has occurred in the apparatus. It is also possible to collate these time-tagged data with data measured by another system. Accordingly, the data management is improved, stepping up the function of the system, which helps take action much more easily and quickly in case of a failure.

In the apparatus monitoring system, the apparatus to be monitored is a power equipment for controlling power supply in an electric power transmission system, the apparatus monitoring system further comprises a digital protection and control unit including: means for sampling the electrical quantity data about the system controlled by the power equipment and the operating state data about the power equipment and converting the sampled data into absolute-time-tagged digital data; protection and control means for protecting and controlling the system according to the digital data; and transmission means for transmitting the digital data as electrical quantity data and operating state data to the communication network. And the data display unit receives the digital data from the data acquisition and transmitting unit and the digital data from the digital protection and control unit via the network, converts the digital data into display data related to the state of the monitored apparatus, and displays these data.

With this apparatus monitoring system, not only the data obtained by the data acquisition and transmitting unit but also the data obtained by the digital protection and control unit can be taken in via the network. In this way, the data from two systems can be combined, allowing a more sophisticated judgment to be made on the state of the apparatus. Use of the data from both systems simplifies the system as much as possible, thus improving cost effectiveness.

In the apparatus monitoring system, the apparatus to be monitored is provided in each electric power installation where electric cables are laid, and the communication network is composed of a first communication network for a local area constructed in each electric power installation and a second communication network for connecting a number of electric power installations in a wide area.

This apparatus monitoring system can be introduced easily, making use of the existing wires, without requiring new wiring work. This improves the application of the system and provides a low-cost system, taking into account the cost for system installation.

In the apparatus monitoring system, one of the data acquisition and transmitting unit, the digital protection and control unit, and the data display unit includes means for calculating an estimated value for a variable related to the deterioration of the function of each part of the apparatus. This calculation is carried out on the basis of one of or both of the condition monitoring data from the data acquisition and transmitting unit, the operating state data from the digital protection and control unit, and the electrical quantity data from the digital protection and control unit.

The one part of the apparatus corresponds to one of a switch contact and a contact of on-load tap changer (hereinafter, referred to as OLTC), and one variable related to the deterioration of the function corresponds to one of the wear condition of a switch contact and the wear condition of a OLTC.

In the above apparatus monitoring system, the expected inspection timing according to the estimated value for the variable related to the deterioration of the function of the apparatus can be displayed on the data display unit. For instance, when the estimated values for the wear condition of the switch contact, and the wear condition of the OLTC contact have been calculated, it is possible to estimate the inspection timing for the switch or the OLTC, on the basis of the obtained estimated value. In this case, maintenance and inspection work can be optimized, which improves the economy of the whole system including the monitored apparatus.

Furthermore, according to the present invention, there is provided a method of monitoring the state of an apparatus installed in a user's electric power installation and creating necessary data. This method comprises: the step of prompting the user to enter information for identifying the performance including the ratings of the apparatus and receiving identification information; the step of receiving the monitoring data about the apparatus; the step of receiving the electrical quantity data about the system controlled by the apparatus; and the step of obtaining the basic performance data about the monitored apparatus by reference to an apparatus database on the basis of the performance identification information, calculating an estimated value for a variable related to the deterioration of the function of the monitored apparatus on the basis of the basic performance data, the received condition monitoring data, and electrical quantity data, and calculating expected inspection timing data according to the obtained estimated value.

In the method, the step of creating the estimated data includes the step of, on the basis of the obtained basic performance data for the apparatus and the received electrical quantity data, calculating, as the estimated value, the accumulated value for the one of the wear condition of a switch, the ware condition of a OLTC contact, and the elapsed service life of a transformer, and the step of calculating expected inspection timing data about the monitored apparatus on the basis of the calculated accumulated value and the obtained basic performance data.

With this method, it is possible to provide the user with the expected inspection timing data according to the estimated value for the variable related to the deterioration of the function of the user's monitored apparatus. The expected inspection timing data is provided for the user, thereby optimizing the user's maintenance and inspection work. Estimated data about an allowable load that does not degrade the service life of the transformer or an allowable over-load time that does not degrade the service life of the transformer under a desired load quantity is also calculated. The calculated estimated data is provided for the user, which enables the user to operate the transformer efficiently using the estimated data. Since the user need not analyze various types of data about the deterioration of the function of the apparatus and the operating efficiency or manage the apparatus database necessary for such data analysis, the burden of maintenance and inspection and of controlling the operating efficiency on the user is decreased.

Furthermore, according to the present invention, there is provided a program for executing a method of monitoring the state of an apparatus installed in a user's electric power installation and calculating necessary data. This program comprises: receiving information for identifying the performance including the ratings of the apparatus; receiving monitoring data about the apparatus; receiving electrical quantity data about the system controlled by the apparatus; and obtaining the basic performance data about the monitored apparatus by reference to an apparatus database on the basis of the performance identification information, calculating an estimated value for a variable related to the deterioration of the function of the monitored apparatus on the basis of the basic performance data, the received condition monitoring data, and electrical quantity data, and calculating expected inspection timing data according to the obtained estimated value.

In addition, according to the present invention, there is provided a program for executing a method of monitoring the state of an apparatus installed in a user's electric power installation and creating necessary data. This program comprises: receiving information for identifying the performance including the ratings of the apparatus; receiving electrical quantity data and operating state data about the apparatus; and obtaining the basic performance data about the apparatus by reference to an apparatus database on the basis of the performance identification information, determining an abnormality occurring in part of the monitored apparatus on the basis of the basic performance data and the received operating state data, and calculating support data according to the determined abnormality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, embodiments to which an apparatus monitoring system and method according to the present invention are applied will be explained in detail by reference to FIGS. 2 to 17.

First Embodiment

Figure 1:
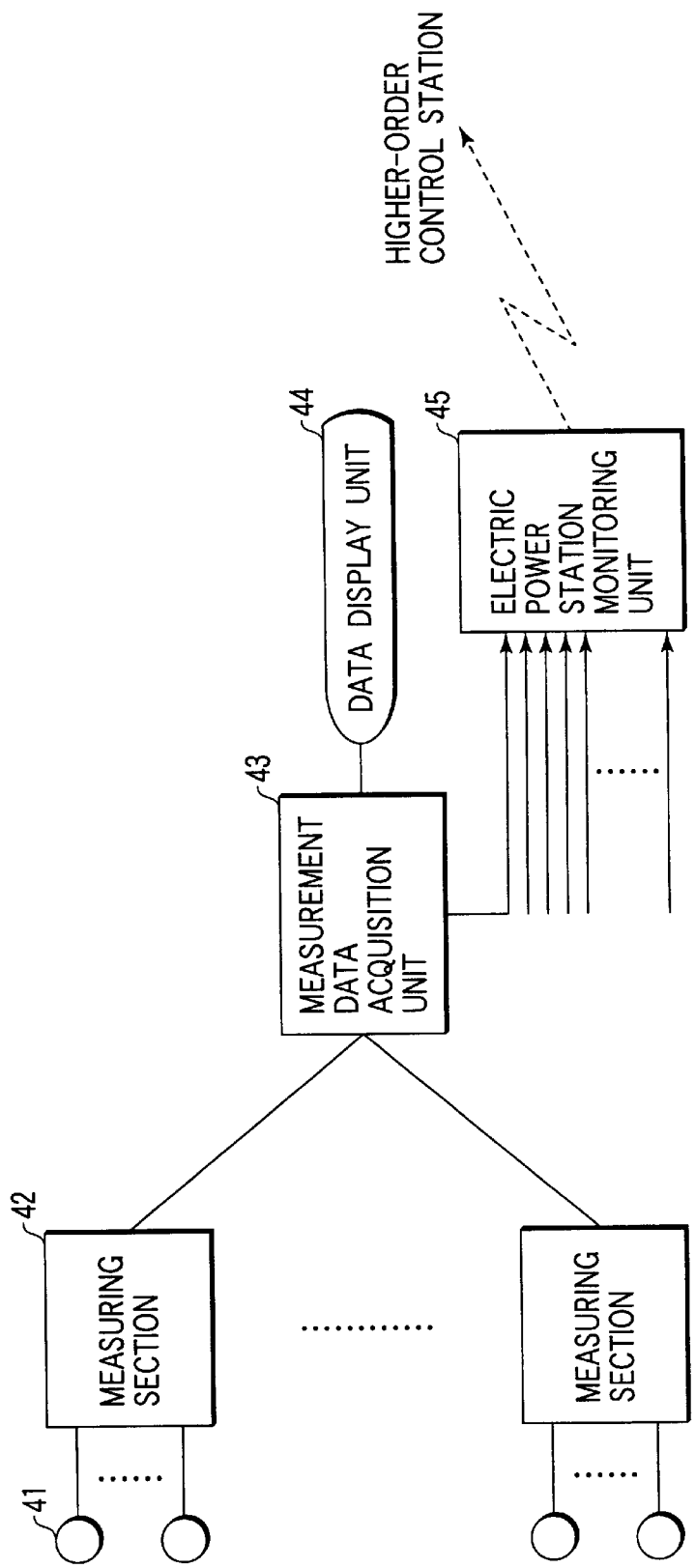
FIG. 1 is a block diagram showing an example of the configuration of a conventional apparatus monitoring and maintenance support system.
Figure 2:
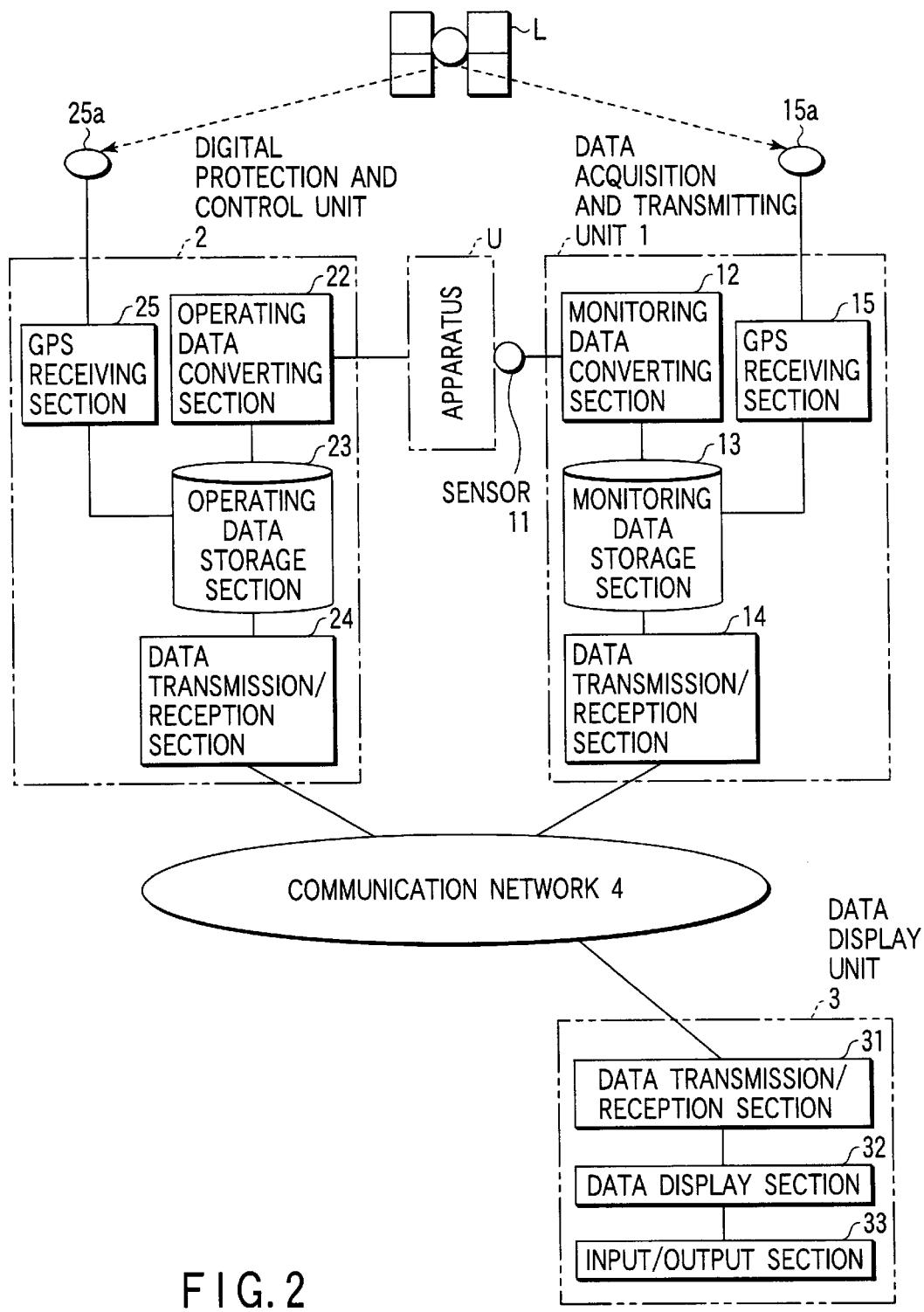
FIG. 2 is a block diagram showing the configuration of an apparatus monitoring system according to a first embodiment of the present invention.

FIG. 2 is a block diagram showing the configuration of an apparatus monitoring system according to a first embodiment of the present invention.

In the apparatus monitoring system of FIG. 2, a data acquisition and transmitting unit 1 for acquiring data and transmitting the acquired data, a digital protection and control unit 2, and a data display unit 3 are connected via a communication network 4. The configuration of each of the three units will be explained below.

The data acquisition and transmitting unit 1 is provided in the vicinity of a monitored apparatus U. The monitored apparatus U is provided with a sensor 11. The sensor 11 measures the characteristics of the monitored apparatus U and outputs a signal indicating the state of the apparatus. A monitoring data converting section 12 samples the signal from the sensor 11. The monitoring data converting section 12 converts the sampled signal into digital condition monitoring data S. The digital condition monitoring data S is stored in a monitoring data storage section 13. The stored digital condition monitoring data S is transmitted by a data transmission/reception section 14 to the external communication network 4.

The data acquisition and transmitting unit 1 further includes a GPS receiving section 15 that receives a signal via a GPS (Global Positioning System) receiving antenna 15a from an satellite L provided with an atomic clock, decodes the GPS signal, and recognizes the accurate absolute time t. According to the absolute time t received by the GPS receiving section 15, the monitoring data converting section 12 and monitoring data storage section 13 are operated.

Specifically, the monitoring data converting section 12 samples the signal indicating the apparatus state from the sensor 11 according to the absolute time t, thereby converting the sense signal into digital condition monitoring data S. Then, the monitoring data storage section 13 adds the absolute time t that sampling was done to the digital condition monitoring data S and stores the resulting data as absolute-time-tagged condition monitoring data S(t). The data transmission/reception section 14 transmits the absolute-time-tagged condition monitoring S(t) to the communication network 4.

The digital protection and control unit 2, which is provided in the vicinity of the monitored apparatus U, includes an operating data converting section 22 that takes in electrical quantity data E about the system and operating state data P about apparatus U and converts them into digital data. The protection and control unit 2 further includes an operating data storage section 23 for storing the digital electrical quantity data E and operating state data P and a data transmission/reception section 24 for transmitting the stored electrical quantity data E and operating state data P to the communication network 4.

The digital protection and control unit 2 further includes a GPS receiving antenna 25a and a GPS receiving section 25 as does the data acquisition and transmitting unit 1. According to the absolute time t received by the GPS receiving section 25, the protection and control unit 2 operates the operating data converting section 22 and operating data storage section 23.

Specifically, the electrical quantity data E about the system and the operating state data P about the apparatus U are inputted to the operating data converting section 22 according to the absolute time t. Thus, the converting section 22 converts the electrical quantity data E and the operating state data P about the apparatus U into digital data. The operating data storage section 23 adds the absolute time t that these data items were inputted to the digital electrical quantity data E and operating state data P and stores the resulting data items as the absolute-time-tagged electrical quantity data E(t) and operating state data P(t). The data transmission/reception section 24 transmits the absolute-time-tagged electrical quantity data E(t) and operating state data P(t) to the communication network 4.

The data display unit 3 includes a data transmission/reception section 31 for transmitting or receiving data via the communication network 4, a data display section 32 for display the data, and an input/output section 33 including an input section, such as a keyboard or a mouse, and an output section, such as a display. The data transmission/reception section 31 receives, via the communication network 4, the absolute-time-tagged condition monitoring data S(t) transmitted from the data transmission/reception section 14 of the data acquisition and transmitting unit 1 and the absolute-time-tagged electrical quantity data E(t) and operating state data P(t) transmitted from the data transmission/reception section 24 of the digital protection and control unit 2 and processes these data items. The data display section 32 displays the state of the monitored apparatus U on the basis of the absolute-time-tagged condition monitoring data S(t), electrical quantity data E(t), and operating state data P(t) received by the data transmission/reception section 31.

In the apparatus monitoring system according to the first embodiment of FIG. 2, the data display unit 3 connected to the network 4 enables the condition monitoring data S(t) about the monitored apparatus U, electrical quantity data E(t), and operating state data P(t) to be checked in real time. Specifically, the data display unit 3 connected to the communication network 4 enables a detailed state quantity of the apparatus U to be checked at any place where the display unit 3 is installed. In the prior art, such a detailed state quantity could be checked only in the vicinity of the apparatus U.

Consequently, the maintenance personnel can check the condition monitoring data easily from a remote place, such as a control station, without going to the site, thus improving the function of the system. This not only helps save labor in apparatus maintenance and take action more easily and quickly in case of a failure, but also improves the operation of the apparatus and system.

Since the absolute time is tagged to the condition monitoring data, it is possible to analyze changes in the apparatus state accurately with respect to time. Therefore, it is possible to display accurately the time that measures have to be taken after the apparatus has malfunctioned. It is also possible to collate these time-tagged data with data measured by another system. Accordingly, the data management is improved, stepping up the function of the system, which helps take action much more easily and faster in case of a failure.

Particularly in the apparatus monitoring system of the first embodiment, since not only the condition monitoring data S(t) obtained via the communication network 4 by the data acquisition and transmitting unit 1 but also the condition monitoring data S(t), electrical quantity data E(t), and operating state data P(t) obtained by the digital protection and control unit 2 constituting the protection and control system are monitored, it is possible to make more sophisticated judgment on the state of the apparatus than when only the condition monitoring data S(t) is used, and take action according to the result of the judgment.

In this case, since every data item is given the absolute time, it is possible to synchronize the data acquisition and transmitting unit 1 with the digital protection and control unit 2 accurately, thereby performing data collation between unit 1 and unit 2. This makes it possible to execute a sophisticated apparatus monitoring process, such as determining the part affected by an abnormality. Use of the data from the digital protection and control unit 2 constituting a separate system enables the apparatus monitoring system to be simplified as much as possible, which makes the system excellent in economy.

While in the apparatus monitoring system of FIG. 2, the GPS receiving section 15 and digital protection and control unit 2 have been used as component parts, either of or both of the GPS receiving section 15 and digital protection and control unit 2 may be eliminated in a modification of the first embodiment.

Second Embodiment

Figure 3:
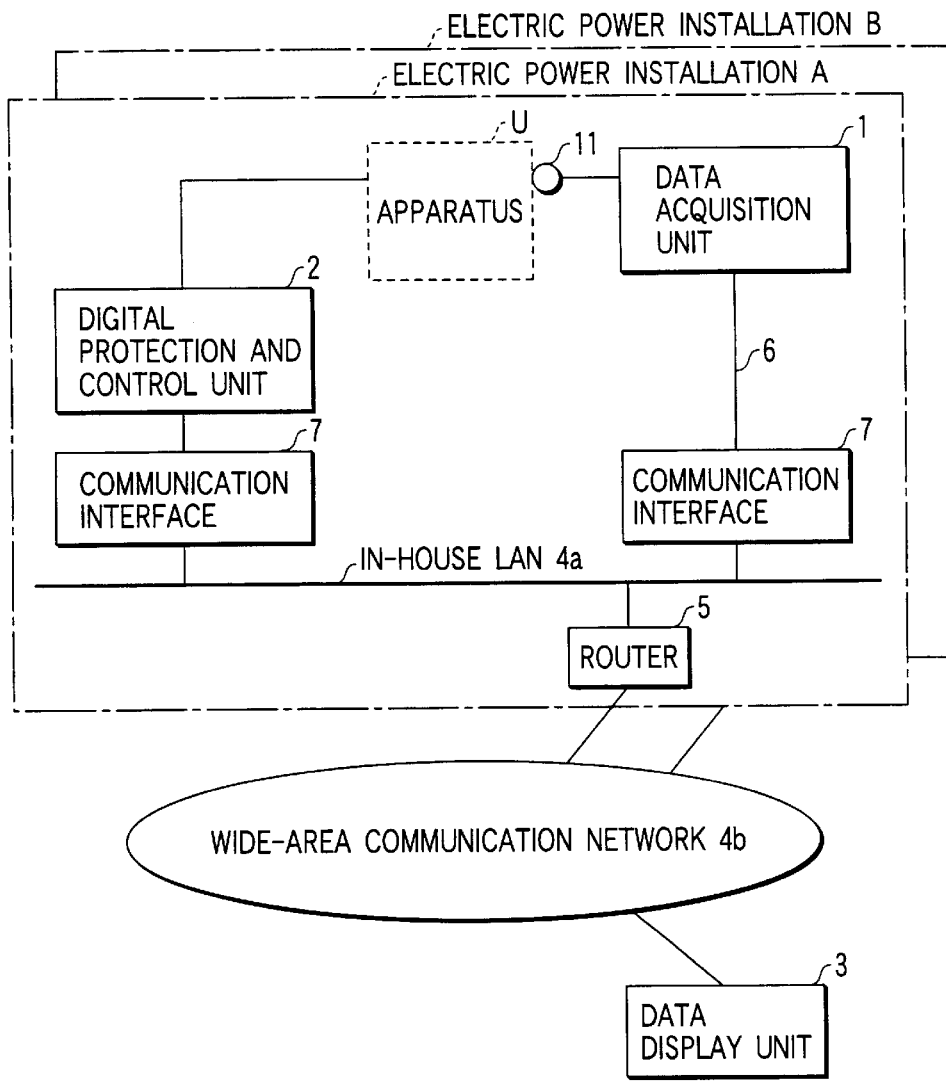
FIG. 3 is a block diagram showing the configuration of an apparatus monitoring system according to a second embodiment of the present invention.

FIG. 3 is a block diagram showing the configuration of an apparatus monitoring system according to a second embodiment of the present invention. In FIG. 3, the same component parts as those in the first embodiment of FIG. 2 are indicated by the same reference numerals and explanation of them will be omitted.

As shown in FIG. 3, the apparatus monitoring system according to the second embodiment is such that, in addition to the configuration of the first embodiment, the communication network 4 is composed of an in-house LAN (a first communication network) 4a and a wide-area communication network (a second communication network) 4b in electric power installations A and B. In the figure, numeral 5 indicates a router that connects the in-house LAN 4a to the wide-area communication network 4b.

A transmission line 6 that connects the data acquisition and transmitting unit 1 to the in-house LAN 4a is composed of unused wires and power supply wires in electrical cables or wireless and a communication interface.

In the apparatus monitoring system according to the second embodiment having the above-described configuration, it is possible to transmit the data from the data acquisition and transmitting unit 1 to the in-house LAN 4a via the existing electric cable or power supply cable or wireless and the communication interface 7.

Since there is no need to provide an additional cable to install only the data acquisition and transmitting unit 1, the number of connection cables in the power installations can be reduced. This makes it possible to simplify the apparatus monitoring system, which improve the economy of the facilities. When the apparatus monitoring system is applied to the existing apparatus, there is no need to lay new cables, making it possible to optimize and speed up the construction of an apparatus monitoring system, which makes the system excellent in economy.

Third Embodiment

Figure 4:
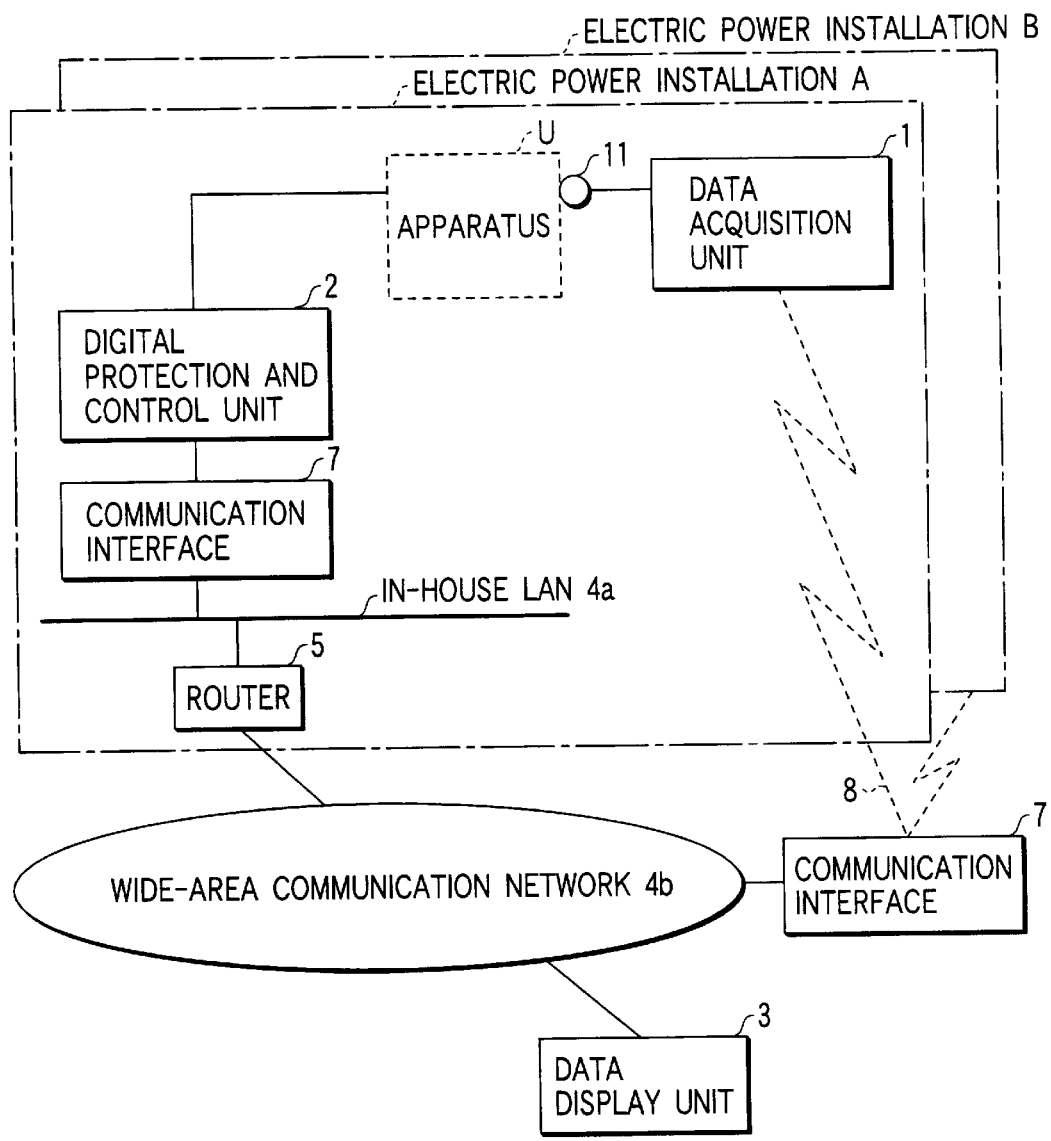
FIG. 4 is a block diagram showing the configuration of an apparatus monitoring system according to a third embodiment of the present invention.

FIG. 4 is a block diagram showing the configuration of an apparatus monitoring system according to a third embodiment of the present invention. In FIG. 4, the same component parts as those in the second embodiment of FIG. 3 are indicated by the same reference numerals and explanation of them will be omitted.

As shown in FIG. 4, the apparatus monitoring system according to the third embodiment is such that, in addition to the configuration of the second embodiment, instead of being connected to the in-house LAN 4a, the data acquisition and transmitting unit 1 is connected directly to the wide-area communication network 4b via a radio channel 8 and the communication interface 7.

In the apparatus monitoring system according to the third embodiment having the above-described configuration, the data acquisition and transmitting unit 1 can transmit the data directly to the communication network 4 via the radio channel 8 and communication interface 7.

Therefore, in the electric power installation, simply installing only the data acquisition and transmitting unit 1 enables an apparatus monitoring system to be constructed easily. In addition, additional cables need not be laid, which reduces the number of connecting cables in the electric power installation. This makes it possible to simplify the apparatus monitoring system, which improves the economy of the facilities. When the apparatus monitoring system is applied to the existing apparatus, there is no need to lay new cables, making it possible to optimize and speed up the construction of an apparatus monitoring system, which makes the system excellent in economy.

Fourth Embodiment

An apparatus monitoring system according to a fourth embodiment of the present invention is such that the frequency band of radio communication used in data transmission from the data acquisition and transmitting unit 1 to the communication network 4 (in-house LAN 4a or wide-area communication network 4b) is set in the range from 800 MHz to 2.5 GHz in the second embodiment of FIG. 3 or third embodiment of FIG. 4.

The fourth embodiment produces the following effect in addition to the effect of the second or third embodiment.

Figure 5:
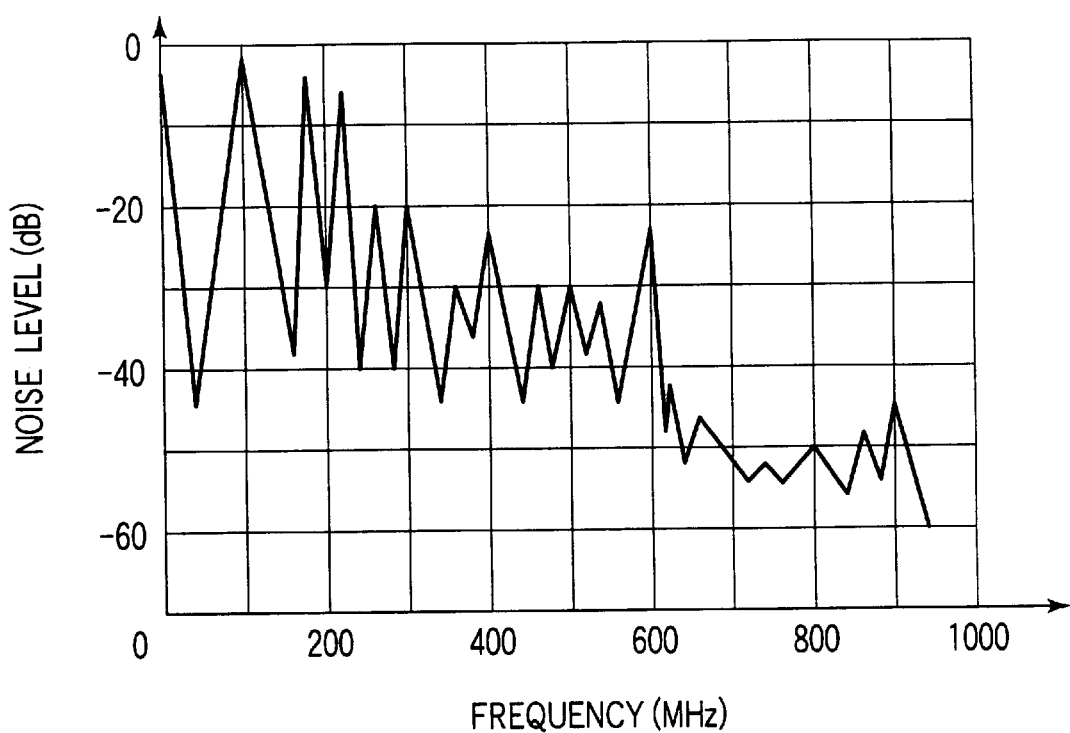
FIG. 5 is a frequency distribution diagram of noise circumstances in an electric power installation to help explain the effect of an apparatus monitoring system according to a fourth embodiment of the present invention.

FIG. 5 shows an example of the result of measuring the level of noise up to 1000 MHz in an actual substation (quoted from IEEE Transaction on Power Delivery, Vol. 9, No. 2, April, 1994). As seen from FIG. 5, since the frequency range of the partial discharge in air is equal to or lower than 600 to 800 MHz, the noise level is low in a frequency region higher than these values.

Therefore, in the apparatus monitoring system according to the fourth embodiment, the data acquisition and transmitting unit 1 transmits the data using radio frequencies in the frequency band equal to or higher than 800 MHz in which the noise level is low in the electric power installation, which enables efficient data transmission.

Moreover, in the apparatus monitoring system according to the fourth embodiment, use of radio communication in a frequency band equal to or lower than 2.5 GHz enables the system to be constructed using a general-purpose communication section. This helps make the apparatus monitoring system much higher in reliability and lower in price.

Fifth Embodiment

Figure 6:
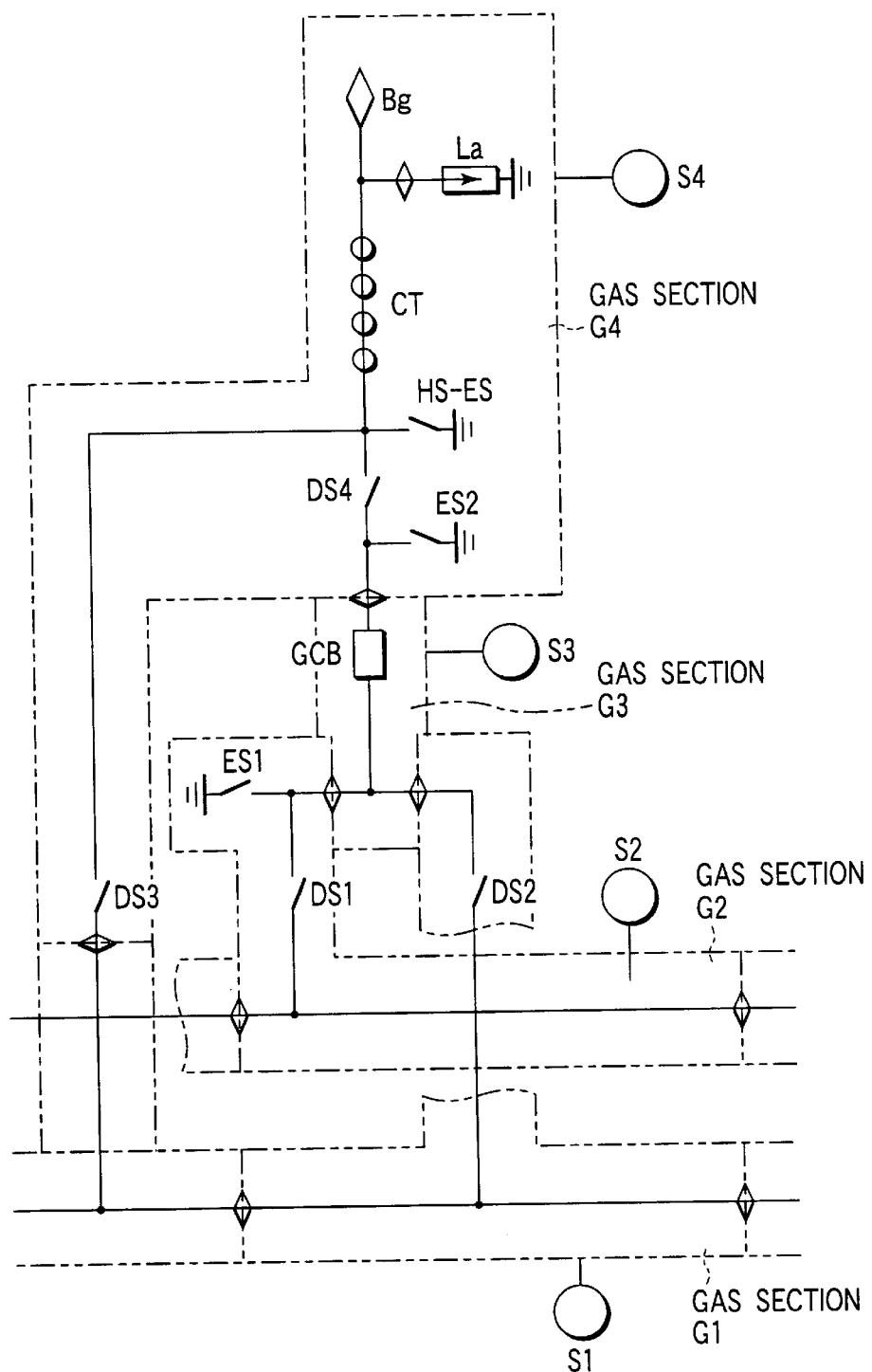
FIG. 6 is a gas system diagram showing the configuration of a gas-insulated switchgear acting as an apparatus to be monitored by an apparatus monitoring system according to a fifth embodiment of the present invention.
Figure 7:
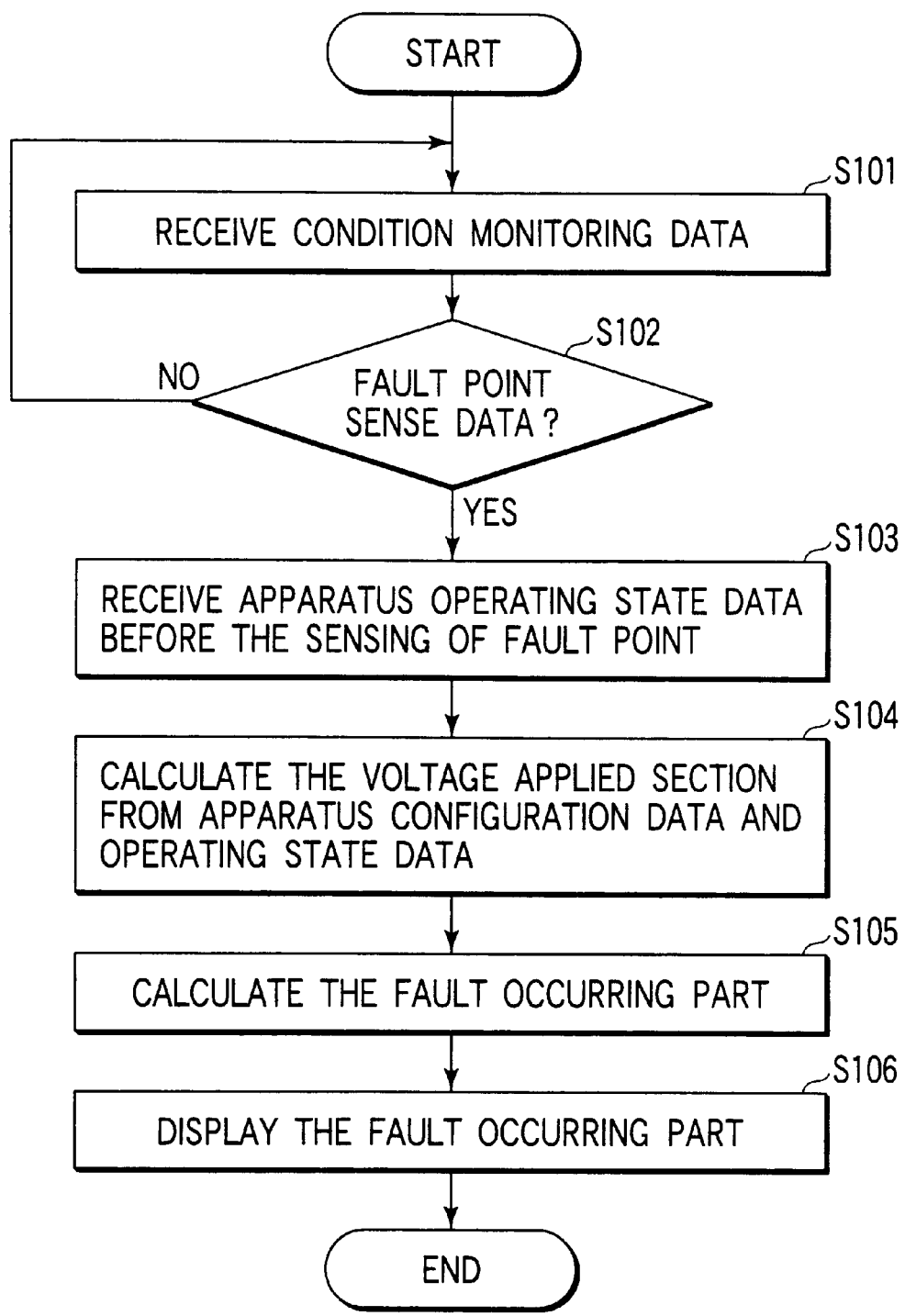
FIG. 7 is a schematic flowchart for an example of the processing of the apparatus monitoring system according to the fifth embodiment.

FIG. 6 is a gas system diagram showing the configuration of a gas-insulated switchgear acting as a monitored apparatus U in an apparatus monitoring system according to a fifth embodiment of the present invention. FIG. 7 is a flowchart giving an outline of the procedure for processing in the fifth embodiment.

The apparatus monitoring system according to the fifth embodiment is such that, in the configuration of the first embodiment of FIG. 2, the data display unit 3 determines the faulty part of the apparatus on the basis of both of or one of the data from the data acquisition and transmitting unit 1 and the data from the digital protection and control unit 2.

In the apparatus monitoring system according to the fifth embodiment having the above-described configuration, the faulty part of the monitored apparatus U can be determined. The process of determining the faulty part in the fifth embodiment will be explained using a case where the monitored apparatus U is a gas-insulated switchgear shown in FIG. 6.

FIG. 6 is a gas system diagram for one bay of a typical gas-insulated switchgear. In the gas-insulated switchgear, each switch is provided in a sealed vessel into which insulating gas is installed. In one bay of the apparatus, the gas sealed divisions are managed as a number of gas sections. In FIG. 6, they are divided into four gas sections G1 to G4. In the figure, the symbol Bg indicates the bushing of a transmission line, the symbol LA a lightning arrester, the symbol CT a current transformer, the symbol DS a disconnecting switch, the symbol ES a earthing switch and the symbol GCB a gas circuit breaker. In a conventional apparatus monitoring system, when a ground fault occurred in such a gas-insulated switchgear, it was possible to determine which gas section had the faulty part in it using the gas pressure sensors S1 to S4 provided in the individual gas sections, but it was impossible to determine its position in further detail.

In the apparatus monitoring system according to the fifth embodiment, when the apparatus has malfunctioned, the data display unit 3 of FIG. 2 executes a series of processes shown in FIG. 7, thereby making it possible to determine the faulty part in further detail. Hereinafter, using the flowchart of FIG. 7, the procedure for determining the faulty part will be explained briefly.

First, at step 101, the data display unit 3 receives the condition monitoring data S(t) sent from the data acquisition and transmitting unit 1. At step 102, if it has been judged that the data received in the receiving process at step 101 is the data for sensing the fault point, control proceeds to step 103, where the data display unit 3 receives the operating state data P(t) before the sensing of the fault point sent from the digital protection and control unit 2.

The processes up to this point will be explained concretely using the gas system diagram of FIG. 6. When a ground fault has been detected in gas section G4, the data display unit 3 receives the data indicating the occurrence of a fault in gas section G4 at step 101. At step 103, the data display unit 3 also receives information about the ON/OFF state of each switch before the occurrence of the fault.

Next, the data display unit 3 calculates the voltage-applied part in the apparatus, for example, the switch that has been turned on, from the previously stored apparatus data and the operating state data P(t) obtained at step 103. The data display unit 3 determines the faulty part at step 105 from the voltage-applied part data calculated at step 104 and displays the determined faulty part at step 106.

The series of processes enables the faulty part to be checked in detail on the data display unit 3. Thus, the apparatus monitoring system according to the fifth embodiment achieves more sophisticated functions, which helps take action much easier and faster in case of a fault.

While in the apparatus monitoring system of the fifth embodiment, the data display unit 3 has determined the faulty part, the present invention is not limited to this configuration. That is, as a modification of the fifth embodiment, the acquisition transmitting unit 1 or digital protection and control unit 2 may determine the faulty part and send information about the determined faulty part as fault locating data to the communication network. This configuration produces the same effect as the fifth embodiment does.

Sixth Embodiment

Figure 8:
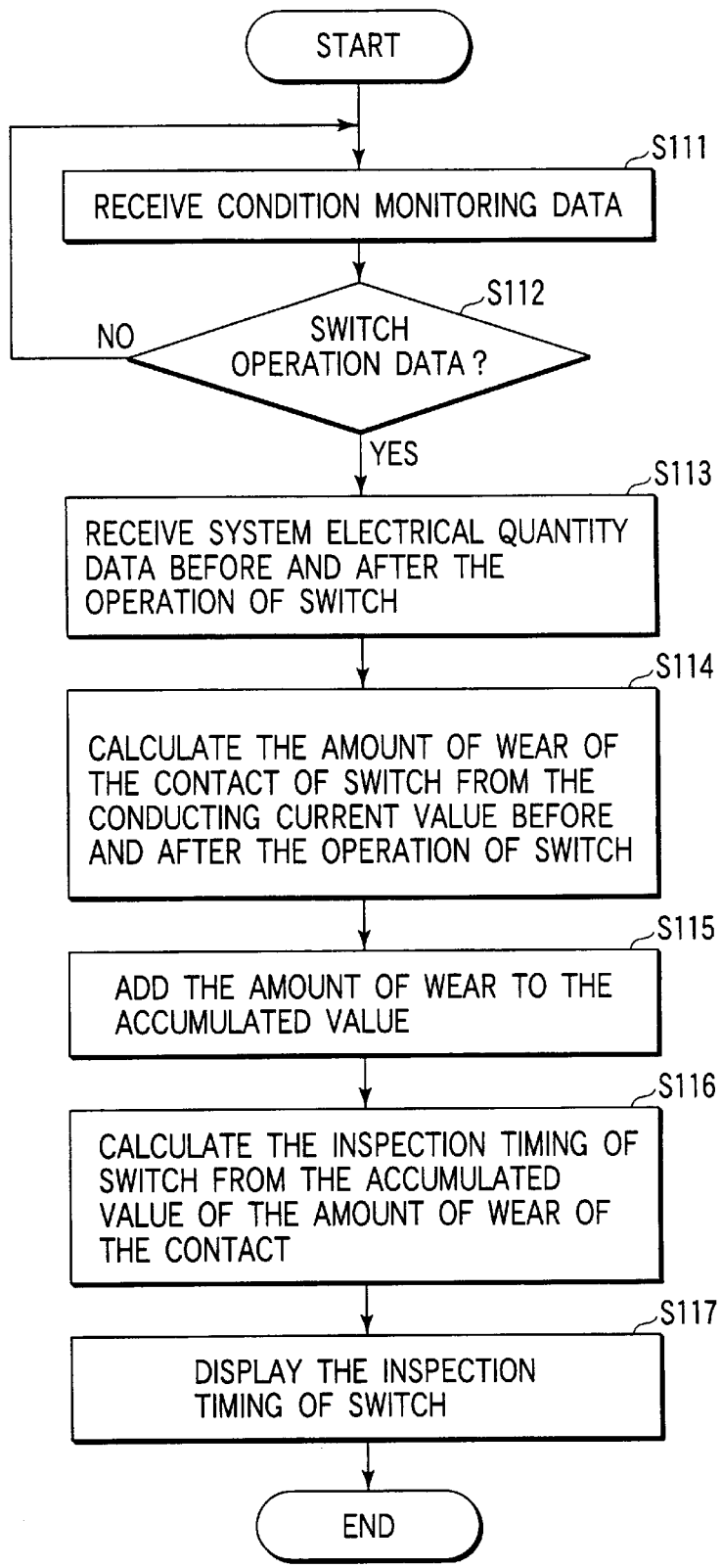
FIG. 8 is a schematic flowchart for an example of the processing of an apparatus monitoring system according to a sixth embodiment of the present invention.

FIG. 8 is a flowchart giving an outline of the procedure for processing in a sixth embodiment of the present invention.

With the configuration of the first embodiment of FIG. 2, the data display unit 3 does calculations to estimate the inspection timing of the apparatus on the basis of both of or one of the data from the digital acquisition transmitting unit 1 and the data from the digital protection and control unit 2.

In the apparatus monitoring system according to the sixth embodiment, the inspection timing of the monitored apparatus U can be estimated with the data display unit 3. Hereinafter, the process of doing calculations to estimate the inspection timing of the apparatus in the sixth embodiment will be explained using a case where the monitored apparatus U is the gas-insulated switchgear.

The gas-insulated switchgear is composed of a number of switches as shown in FIG. 6. One of the items that influence the inspection timing of the switches is the contact wear. Since the contact wear of the switch contact is determined by the value of the interrupted current as described earlier, measuring the conducting current value before and after the operation of the switch enables the amount of wear of the contact to be calculated.

In the apparatus monitoring system of the sixth embodiment, the data display unit 3 of FIG. 2 carries out a series of processes shown in FIG. 8, enabling the accumulated wear of the switch contact to be calculated, which makes it possible to estimate the inspection timing of the switch. The procedure for doing calculations to estimate the inspection timing with the data display unit 3 will be explained briefly by reference to the flowchart of FIG. 8.

First, at step 111, the data display unit 3 receives the condition monitoring data S(t) transmitted from the data acquisition and transmitting unit 1. At step 112, if the data display unit 3 has judged that the data received in the receiving process at step 111 is related to the operation of the switch, control proceeds to step 113, where the data display unit 3 receives the electric quantity data E(t) sent from the digital protection and control unit 2 before and after the operation of the switch. Specifically, it receives the conducting current value of the switch.

Next, at step 114, the data display unit 3 calculates the amount of wear of the switch contact in the operation from the received conducting current value before and after the operation of the switch. At step 115, the amount of wear of the contact calculated at step 114 is added to the accumulated amount up to that point of time. At step 116, the data display unit 3 calculates the inspection timing of the switch. At step 117, the data display unit 3 displays the calculated inspection timing on the screen.

Such a series of processes makes it possible to check the inspection timing of the gas-insulated switchgear, the monitored apparatus, on the data display unit 3. This makes the function of the apparatus monitoring system much more sophisticated and optimize maintenance and inspection work, which improves the economy of the whole system including the monitored apparatus.

While in the apparatus monitoring system of the sixth embodiment, the data display unit 3 does calculations to estimate the inspection timing, the present invention is not limited to this configuration. Specifically, as a modification of the sixth embodiment, the data acquisition and transmitting unit 1 or digital protection and control unit 2 may do calculations to estimate the inspection timing and send the estimated inspection timing as inspection timing data to the communication network. This configuration produces the same effect as the sixth embodiment does.

Seventh Embodiment

Figure 9:
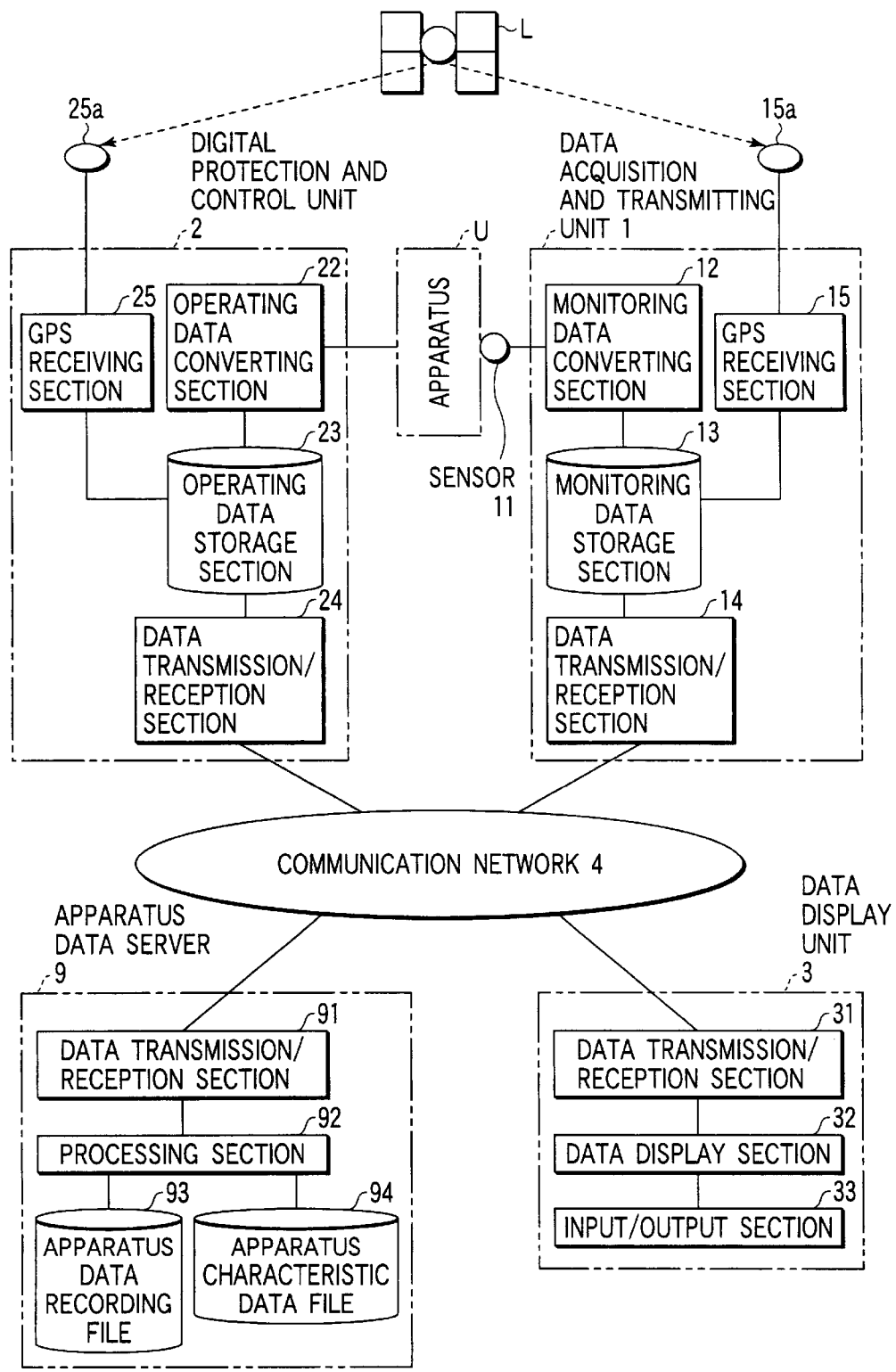
FIG. 9 is a block diagram showing the configuration of an apparatus monitoring system according to a seventh embodiment of the present invention.

FIG. 9 is a block diagram showing the configuration of an apparatus monitoring system according to a seventh embodiment of the present invention. In FIG. 9, the same component parts as those in the first embodiment of FIG. 2 are indicated by the same reference numerals and explanation of them will be omitted.

As shown in FIG. 9, the apparatus-monitoring system according to the seventh embodiment is provided with an independent apparatus-data server 9. The apparatus-data server 9 is connected via the communication network 4 to the data acquisition and transmitting unit 1, digital protection and control unit 2, and data display unit 3.

The apparatus-data server 9 includes not only a data transmission/reception section 91 and a processing section 92 but also an apparatus-data recording file 93 and an apparatus characteristic data file 94. The data transmission/reception section 91 receives the absolute-time-tagged condition monitoring data S(t) sent from the data transmission/reception section 14 of the data acquisition and transmitting unit 1, the absolute-time-tagged electrical quantity data E(t) and operating state data P(t) sent from the data transmission/reception section 24 of the digital protection and control unit 2 via the communication network 4 and processes these data. Using the received condition monitoring data S(t), electrical quantity data E(t), operating state data P(t), and the basic performance data and apparatus configuration data in the apparatus characteristic data file 94, the processing section 92 monitors the apparatus, makes supporting calculations for the maintenance of the apparatus, stores the result of the calculations in the apparatus-data recording file 93, and, if necessary, reports the result to the data display unit 3.

The apparatus-data recording file 93 is a file that holds and accumulates recording data about various apparatuses computed at the processing section 92. The apparatus characteristic data file 94 is a file that stores not only general basic performance data not limited to the target electric power installation, including apparatus configuration data, apparatus characteristic data indicating various coefficients differing according to the characteristic of the apparatus, and apparatus inspection correlation data indicating the correlation between the apparatus characteristic data and the required inspection timing, but also electric power installation configuration data inherent to the target power installation, including performance identification data about various apparatuses constituting the power installation and system data.

The apparatus-data server 9 may be provided as a data server for a single user's exclusive use. Generally, the apparatus-data server 9 is constructed as a service center that monitors the electric power installations of a number of users, calculates necessary data, and provides the calculated data for each user. In the figure, only the apparatus-data server 9, data acquisition and transmitting unit 1 for a user, digital protection and control unit 2, and data display unit 3 are connected. Actually, however, the same units 1 to 3 for each of the users are connected. In the apparatus-data recording file 93, the data for each user is recorded. In the apparatus characteristic data file 94, general basic performance data about each apparatus is recorded as data common to the users. At the same time, the power installation configuration data about each user's power installation is recorded.

Each user's apparatus configuration data recorded in the apparatus characteristic data file 94 can be obtained as follows. The apparatus-data server 9 transmits an input support screen for input of the apparatus configuration data, which is displayed on the data display section 32 of the user's data display unit 3, and then the user enters the performance identification data for each unit constituting the power installation, the system data, and the like from the input/output section 33 of the data display unit 3, while viewing the input support screen. In this case, the performance identification data for each apparatus includes the name of the apparatus, rated voltage, and rated current. The system data includes the name of each system, the connection sequence and names of apparatuses constituting each system, and the connecting method.

Figure 10:
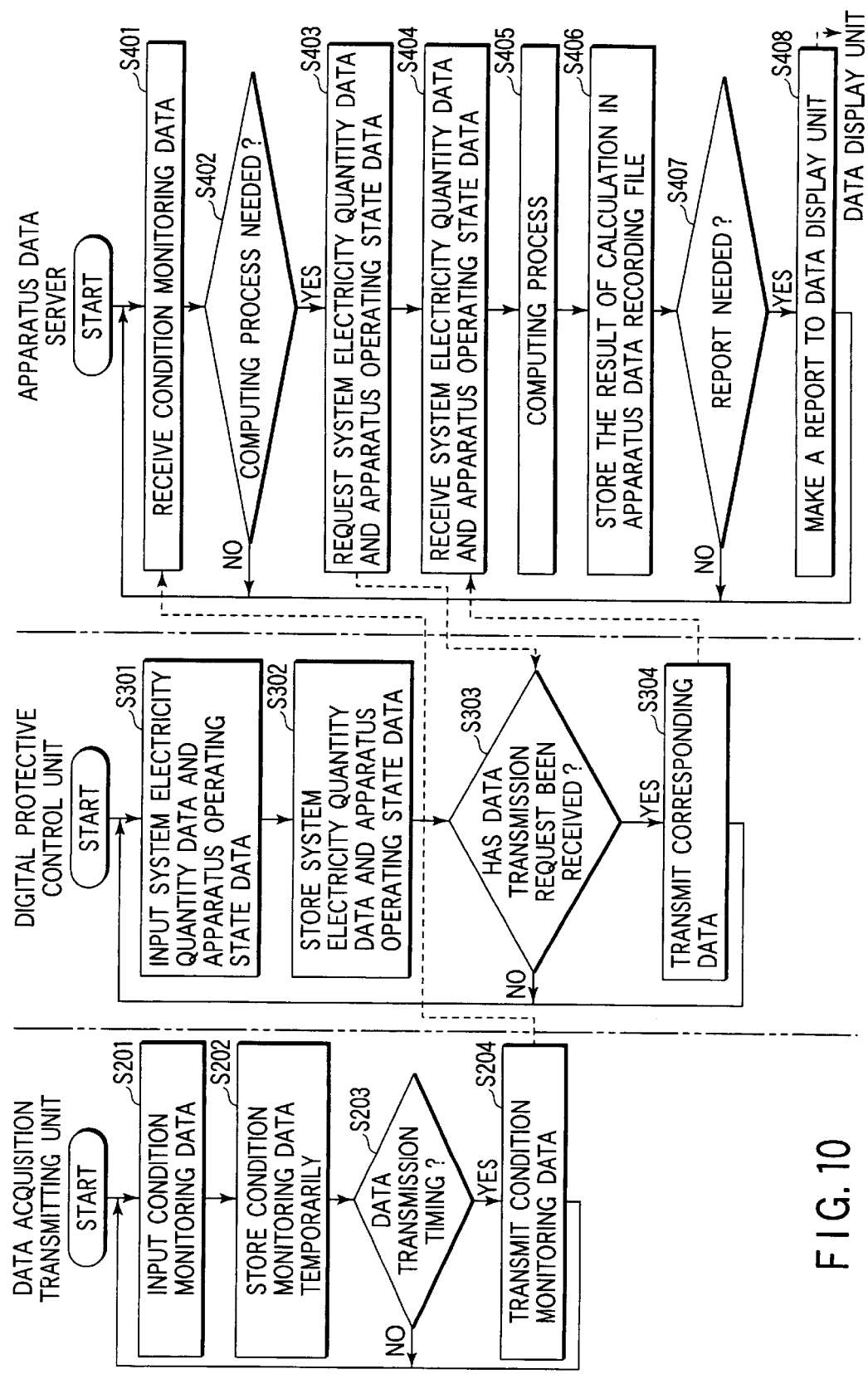
FIG. 10 is a schematic flowchart for an example of the processing of the apparatus monitoring system according to the seventh embodiment.

FIG. 10 is a flowchart showing an outline of the procedure for processing data and recording the apparatus monitoring and maintenance support data at the data acquisition and transmitting unit 1, digital protection and control unit 2, and apparatus-data server 9 in the system with the above-described configuration.

As shown in FIG. 10, the monitoring data converting section 12 inputs the condition monitoring data to the data acquisition and transmitting unit 1 at a specific time or each time an operation is carried out (step 201). The time obtained at the GPS receiving section 15 is added to the inputted condition monitoring data. The resulting data is stored temporarily in the monitoring data storage section 13 (step 202). The data acquisition transmitting unit 1 judges data according to a preset transmission condition. If the data transmission timing has been reached (YES at step 203), the data acquisition and transmitting unit 1 transmits the corresponding condition monitoring data to the apparatus-data server 9 (step 204).

In parallel with this, the system electrical quantity data and apparatus operating state data are inputted to the operating data converting section 22 in the digital protection and control unit 2 at a specific time or each time an operation is carried out (step 301). The time obtained at the GPS receiving section 25 is added to the inputted data. The resulting data are held temporarily in the operating data storage section 23 (step 302).

Next, the apparatus-data server 9 receives the condition monitoring data transmitted at step 204 (step 401). If having judged on the basis of the type of the received data that the data needs a computing process (YES at step 402), the apparatus-data server 9 requests the digital protection and control unit 2 to transmit the system electrical quantity data and apparatus operating state data at the corresponding time (step 403).

Receiving the data (YES at step 303), the digital protection and control unit 2 transmits the corresponding data stored in the operating data storage section 23 to the apparatus-data server 9 (step 304). Receiving the data (step 404), the apparatus-data server 9 does calculations to monitor the apparatus and support the maintenance of the apparatus using the condition monitoring data, system electrical quantity data, apparatus operating state data, and the data in the apparatus characteristic data file 94 (step 405). Thus, the apparatus-data server 9 stores the result of the calculations in the apparatus-data recording file 93 (step 406). If the result also needs to be reported to the data display unit 3 (YES at step 407), the server 9 reports the result to the data display unit 3 (step 408).

In the present system, the apparatus-data server 9 enables the inspection timing of the monitored apparatus U to be estimated. The process of making calculations to estimate the inspection timing of the apparatus in the seventh embodiment will be explained using a case where the monitored apparatus U is the gas-insulated switchgear of FIG. 6.

As described earlier, the amount of wear of the switch contact that influences the inspection timing of the switch is determined by the value of the interrupted current. Thus, measuring the conducting current value before and after the operation of the switch enables the amount of wear of the contact to be calculated.

Figure 11:
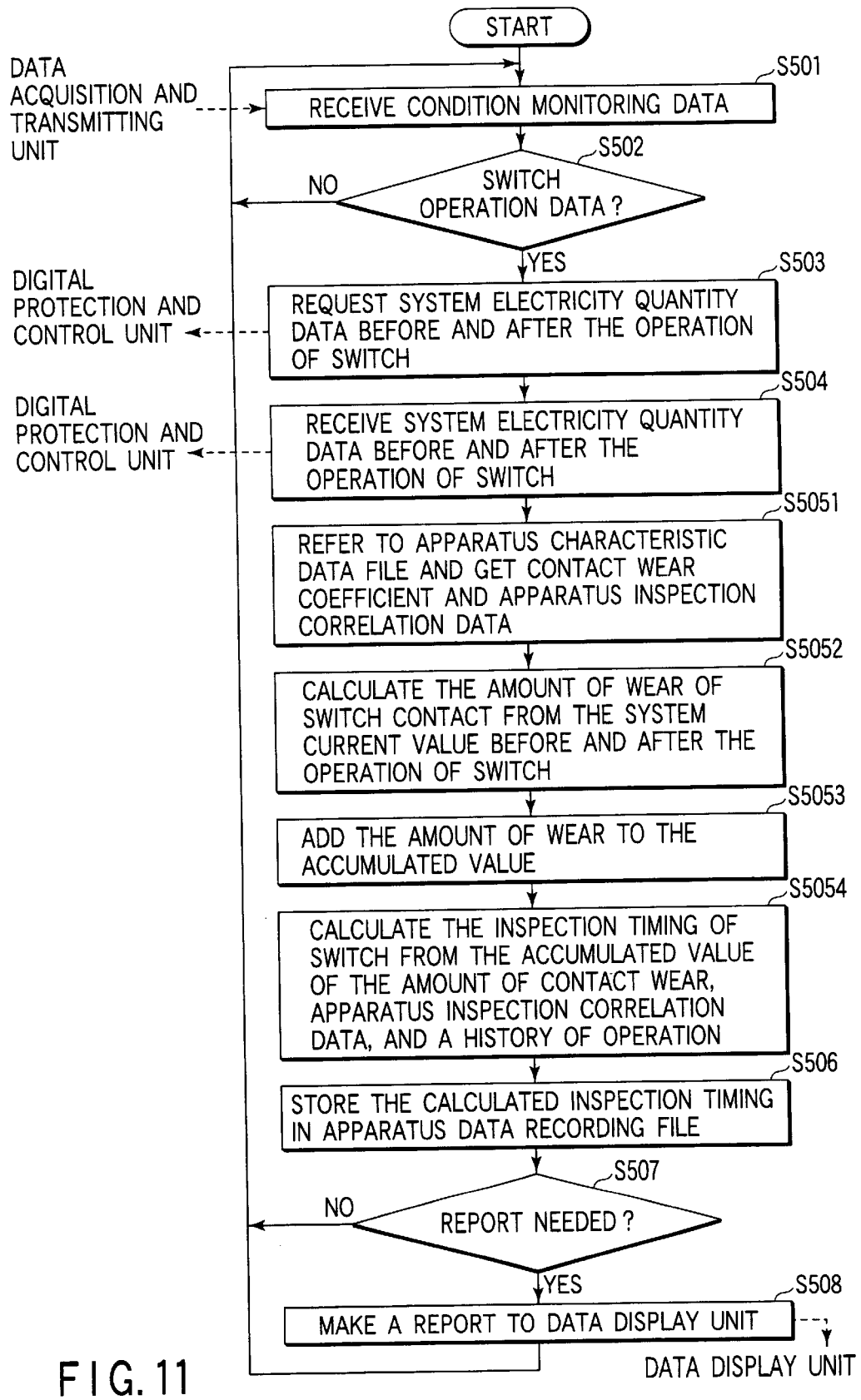
FIG. 11 is a schematic flowchart for an example of the processing of an apparatus-data server in the apparatus monitoring system according to the seventh embodiment.

In the apparatus monitoring system of the seventh embodiment, the apparatus-data server 9 of FIG. 9 carries out a series of processes shown in FIG. 11, thereby calculating the amount of wear of the switch contact, which enables the inspection timing of the switch to be estimated. Referring to the flowchart of FIG. 11, the procedure for doing calculations to estimate the inspection timing at the apparatus-data server 9 will be explained briefly.

First, at step 501, the apparatus-data server 9 receives the condition monitoring data S(t) sent from the data acquisition and transmitting unit 1. At step 502, if the apparatus-data server 9 have judged that the data received in the reception process at step 501 is the switch operation data, control proceeds to step 503 where it requests the system electrical quantity data before and after the operation of the apparatus from the digital protection and control unit 2. At step 504, the apparatus-data server 9 receives the electrical quantity data E(t) before and after the operation of the switch. Specifically, the server 9 receives the conducting current value of the switch.

Next, at step 5051, the apparatus-data server 9 refers to the apparatus characteristic data file 94 and gets the contact wear coefficient indicating the relationship between the contact wear of the corresponding switch and the switching current and the apparatus inspection correlation data indicating the correlation between the accumulated wear of the contact of the corresponding switch and the time when inspection will be needed. At step 5052, the server 9 calculates the amount of wear of the switch contact in the operation using the electrical quantity data E(t) received at step 504 and the contact wear coefficient obtained at step 5051. At step 5053, the server 9 adds the contact wear data calculated at step 5052 to the accumulated value to that point of time. At step 5054, the server 9 calculates the inspection timing of the switch from the accumulated wear, apparatus inspection correlation data, and the operation history up to now. At step 506, the server 9 stores the calculated inspection timing data in the apparatus-data recording file 93.

Furthermore, at step 507, when the inspection timing is in near future, the apparatus-data server 9 makes a report to the data display unit 3 at step 508.

Receiving the report, the data display unit 3 refers to the apparatus-data recording file 93 in the apparatus-data server 9 via the communication network 4, which enables the detailed inspection timing data for the switch to be checked.

Figure 12:
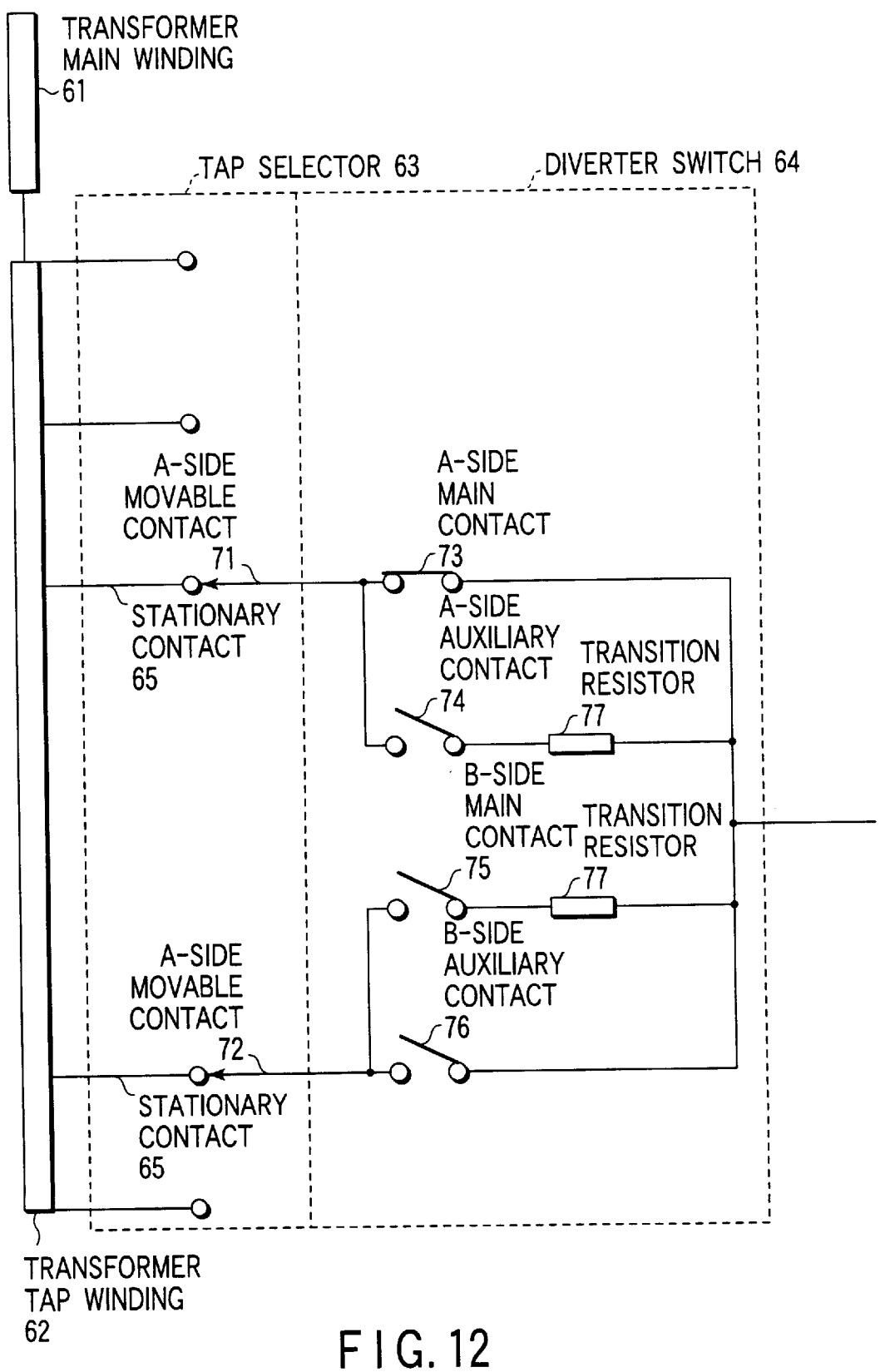
FIG. 12 is a hookup diagram showing the configuration of an OLTC acting as an apparatus to be monitored by the apparatus monitoring system according to the seventh embodiment.

Using a case where the monitored apparatus U is a OLTC provided in a transformer in a transmission and distribution system as shown in FIG. 12, the process of doing calculations to estimate the inspection timing of the apparatus in the seventh embodiment will be explained.

As shown in FIG. 12, the OLTC provided in a transformer tap winding 62 connected to a transformer primary winding 61 is composed of a tap selector 63 that selects a tap drawn from the tap winding in the unloading state and a diverter switch (hereinafter, referred to as DS) 64 that cuts off or allows to flow the load current of the transformer or the bridging current between taps.

The contact group of the DS 64 wears gradually each time the tap changeover is executed. In the case of a resistance type OLTC, unbalance wear of a DS contact may arise. A diagnostic check on this phenomena has been run. There are two types of the resistance type OLTC: a 2-resistor OLTC and a 4-resistor OLTC. FIG. 12 is a circuit diagram illustrating the principle of a 2-resistor OLTC. In FIG. 12, numeral 65 indicates a stationary contact corresponding to each tap of the transformer tap winding 62. Numerals 71 to 76 indicate the individual contacts of the OLTC. Numeral 77 indicates a transition resistor. To simplify explanation, an unbalance wearing phenomenon in a 2-resistor OLTC and its diagnosing method will be explained. The same basically holds true for a 4-resistor OLTC.

The circuit of the tap that is now carrying current is called A side and the circuit of the tap to be connected next time is called B side. In FIG. 12, a parallel circuit of an A-side main contact 73 and a auxiliary contact 74 is connected in series with an A-side movable contact 71. A parallel circuit of a B-side auxiliary contact 75 and a main contact 76 is connected in series with a B-side movable contact 72. A transition resistor 77 is connected in series with each of the A-side auxiliary contact 74 and B-side auxiliary contact 75. Because the A-side movable contact 71 of the tap selector 63 is caused to touch the stationary contact 65 corresponding to the tap now carrying current and the A-side main contact 73 is closed, the A-side circuit is in the conducting state.

In this state, the procedure for changing over the tap from the A side to B side is as follows. When the electrically powered mechanism (not shown) for the OLTC is started:

(1) The B-side movable contact 72 of the tap selector 63 comes off the stationary contact 65 and is caused to touch another stationary point 65 corresponding to the tap to be connected next time. At this time, current is prevented from flowing to the B side.

(2) The A-side auxiliary contact 74 of DS 64 is closed.

(3) The A-side main contact 73 of DS 64 is opened.

(4) The B-side auxiliary contact 75 of DS 64 is closed.

(5) The A-side auxiliary contact 74 of DS 64 is opened.

(6) The B-side main contact 76 of DS 64 is closed.

(7) The B-side auxiliary contact 75 of DS 64 is opened, which completes the changeover operation of one tap.

In such a tap changeover process, the individual contacts 73 to 76 of DS 64 wear. The wearing of the main contacts 73, 76 differs from that of the auxiliary contacts 74, 75. Specifically, the amount of wear of the main contacts 73, 76 varies according to the load current at the changeover of the tap, with the result that the wear increases in proportion to almost the square of the load current. In contrast, the amount of wear of the auxiliary contacts 74, 75 is less influenced by the load current value than that of the main contacts 73, 76, presenting a constant wearing tendency. It is common practice to design the contacts of the DS so that, when the transformer is operated in the vicinity of the rated current, the individual contacts may wear equally. Thus, if the changeover of the OLTC were continued in a state where the load current of the transformer is small, the auxiliary contacts might wear faster than the main contacts. This phenomenon is called unbalance wear of contacts.

Explanation of the mechanism will not be given. The larger the amount of wear of the auxiliary contacts becomes than that of the main contacts, the shorter the time required for changeover in steps (3) and (4) in the changeover procedure becomes. When the changeover time become extremely short, the current is not cut off properly. To effect changeover reliably, the B-side auxiliary contact 75 has to be closed after a time equal to or longer than half the period of the power supply frequency has elapsed since the A-side main contact 73 was mechanically opened. This is the time required to guarantee that the A-side main contact 73 passes the current zero point surely and completes the electrical interruption. If this condition is not satisfied, there is a possibility that a voltage for one tap winding will be applied across the A-side main contact 73 before the A-side main contact 73 is electrically opened and arc be impossible to suppress.

Figure 13:
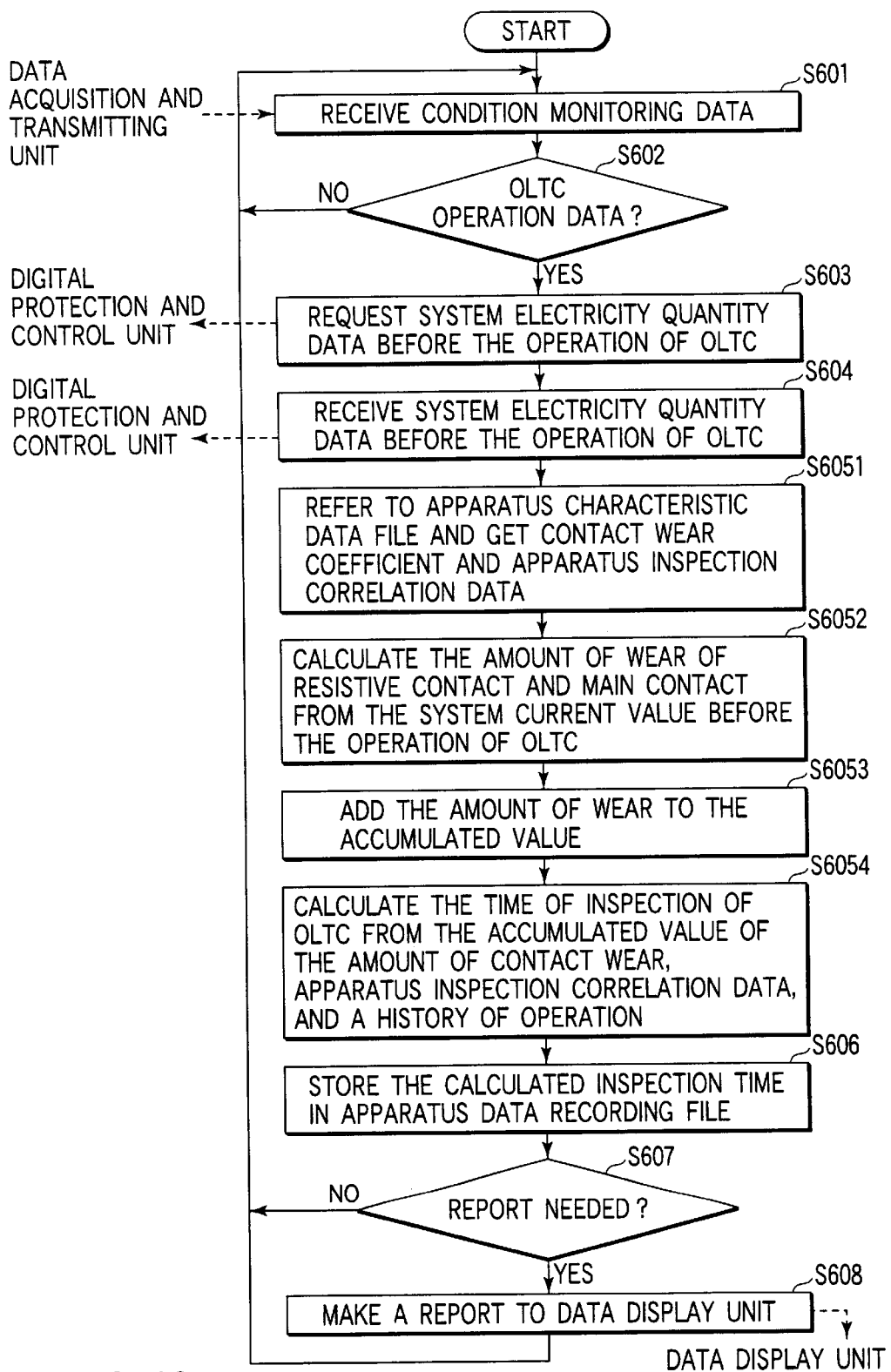
FIG. 13 is a schematic flowchart for an example of the processing of an apparatus-data server in the apparatus monitoring system according to the seventh embodiment.

In the apparatus monitoring system of the seventh embodiment, the apparatus-data server of FIG. 9 carries out a series of processes shown in FIG. 13, thereby calculating the amount of wear of the auxiliary contacts and main contacts of the OLTC and DS, which enables the inspection timing of the OLTC to be estimated. Referring to the flowchart of FIG. 13, the procedure of doing calculations to estimate the inspection timing will be explained briefly.

First, at step 601, the apparatus-data server 9 receives the condition monitoring data S(t) sent from the data acquisition and transmitting unit 1. At step 602, if the apparatus-data server 9 have judged that the data received in the reception process at step 601 is the OLTC operation data, control proceeds to step 603 where it requests the system electrical quantity data before the operation of the OLTC from the digital protection and control unit 2. At step 604, the server 9 receives the electrical quantity data E(t) before the operation of the OLTC. Specifically, the server 9 receives the conducting current value of the OLTC.

Next, at step 6051, the apparatus-data server 9 refers to the apparatus characteristic data file 94 and gets the contact wear coefficient indicating the relationship between the contact wear of the corresponding OLTC and DS and the switching current and the apparatus inspection correlation data indicating the correlation between the accumulated wear of the contact of the corresponding OLTC. At step 6052, the apparatus-data server 9 calculates the amount of wear of the contacts of the OLTC and DS and that of the main contacts in the operation using the electrical quantity E(t) received at step 604 and the contact wear coefficient obtained at step 6051. At step 6053, the server 9 adds the contact wear data calculated at step 6052 to the accumulated value to that point of time. At step 6054, the server 9 estimates the replacement time of the main contacts and auxiliary contacts from the accumulated wear of each contact and calculates the inspection timing of the OLTC from the apparatus inspection correlation data obtained at step 6051 and a history of operation up to this point. At step 606, the server 9 stores the calculated inspection timing in the apparatus-data recording file 93.

Furthermore, at step 607, when the inspection timing is in near future, the apparatus-data server 9 makes a report to the data display unit 3 at step 608.

Receiving the report, the data display unit 3 refers to the apparatus-data recording file 93 in the apparatus-data server 9 via the communication network 4, which enables the detailed inspection timing data for the OLTC to be checked.

Such a series of processes by the apparatus-data server 9 enables the user to check the inspection timing of the switch, a monitored apparatus, and the OLTC easily on the data display unit 3. Therefore, the seventh embodiment makes the function of the apparatus monitoring system much more sophisticated and optimizes maintenance and inspection work as the sixth embodiment does, which improves the economy of the whole system including the monitored apparatus.

Furthermore, in the seventh embodiment, the apparatus-data server 9 calculates the inspection timing on the basis of the apparatus inspection correlation data inherent to the apparatus, it can calculates the inspection timing accurately even for various apparatuses differing in configuration. Providing the obtained required inspection timing data for the user makes it possible to streamline the user's maintenance and inspection work. Since the user need not analyze various types of data about the deterioration of various apparatuses, including switches and OLTCs or manage the apparatus database necessary for such data analysis, the burden of maintenance and inspection on the user is decreased so much more.

Moreover, the seventh embodiment manages the apparatus inspection correlation data, the maker's know-how, with the apparatus-data server 9 and provides the data for limited users, which makes it possible to realize a highly practical business model making use of technical knowledge.

Eighth Embodiment

Figure 14:
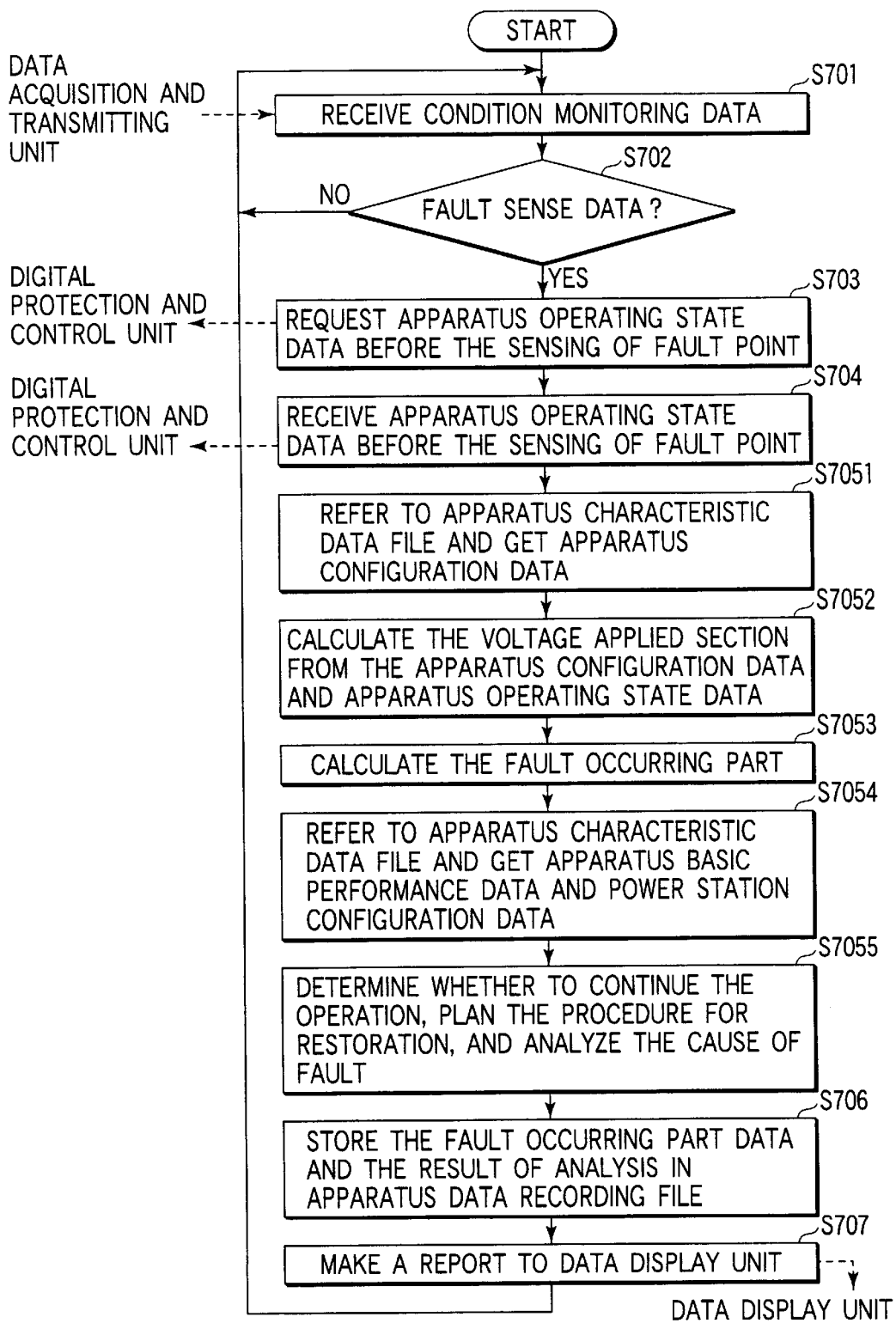
FIG. 14 is a schematic flowchart for an example of the processing of an apparatus monitoring system according to an eighth embodiment of the present invention.

FIG. 14 is a flowchart showing an outline of the procedure for processing in an eighth embodiment of the present invention.

The eight embodiment is such that, in the configuration of the seventh embodiment of FIG. 9, the apparatus-data server 9 determines the faulty part of the apparatus on the basis of the condition monitoring data S(t) from the data acquisition and transmitting unit 1, the operating state data P(t) from the digital protective unit 2, and the data in the apparatus characteristic data file 94 and reports support data, including data about whether to continue the operation, the procedure for restoration, and the cause of the fault, to the data display unit 3.

With the eighth embodiment having the above-described configuration, the faulty part of the monitored apparatus U is determined and more concrete support data can be created according to the faulty part. Using a case where the monitored apparatus U is the gas-insulated switchgear of FIG. 6, the process of determining the faulty part in the eighth embodiment will be explained.

As explained in the fifth embodiment, when a ground fault has occurred inside the gas-insulated switchgear of FIG. 6, a conventional apparatus monitoring system was able to determine the faulty part on a gas section basis using the gas pressure sensors S1 to S4 provided in the individual gas sections but was unable to determine the position in further detail.

With the apparatus monitoring system of the eighth embodiment, however, when a fault has occurred in the apparatus, the apparatus-data server 9 of FIG. 9 carries out a series of processes shown in FIG. 14, thereby determining the faulty part in further detail. Referring to the flowchart of FIG. 14, the procedure for determining the faulty part will be explained briefly.

First, at step 701, the apparatus-data server 9 receives the condition monitoring data S(t) sent from the data acquisition and transmitting unit 1. At step 702, if the apparatus-data server 9 have judged that the data received in the reception process at step 701 is the fault point sensing data, control proceeds to step 703 where it requests the system operating state data before the detecting of the fault point from the digital protection and control unit 2. At step 704, the server 9 receives the operating state data P(t) before the detecting of the fault point. The processes to this point will be explained concretely by reference to the gas system diagram of FIG. 8. When a ground fault has been sensed in gas section G4, the server 9 receives the data indicating the occurrence of a fault in gas section G4 at step 701 and further receives information about the ON/OFF state of each switch before the occurrence of the fault at step 704.

Next, at step 7051, the apparatus-data server 9 refers to the apparatus characteristic data file 94 and gets the apparatus configuration data about the apparatus. At step 7052, the server 9 calculates the voltage-applied part of the apparatus using the apparatus configuration data and the operating state data P(t) obtained at step 704. At step 7053, the server 9 determines the faulty part from the voltage-applied part calculated at step 7052. Then, at step 7054, the server 9 refers to the apparatus data file 94 and gets the basic performance data about the apparatus, the power installation configuration data about the power installation, and others. On the basis of these data and the faulty part, the server 9 determines whether to continue the operation, plans the procedure for restoration, and analyze the cause of the fault. At step 706, the server 9 stores the faulty part data and the result of the analysis in the apparatus-data recording file 93.

Furthermore, at step 707, the apparatus-data server 9 makes a report to the data display unit 3. Receiving the report, the data display unit 3 refers to the apparatus-data recording file in the apparatus-data server via the communication network 4, which makes it possible to check the detailed faulty part data and obtain support data about, for example, whether to continue the operation, the procedure for restoration, and the cause of the fault.

Such a series of processes by the apparatus-data server 9 enables the user not only to check the faulty part of the monitored apparatus in detail on the data display unit 3 but also to obtain support data about, for example, whether to continue the operation, the procedure for restoration, and the cause of the fault. Therefore, the eighth embodiment makes the function of the apparatus monitoring system more sophisticated and helps take measures much more easily and faster in case of a fault.

In the eighth embodiment, after the apparatus-data server 9 determines the faulty part, it creates more concrete support data about whether to continue the operation, the procedure for restoration, and the cause of the fault, and others. Even when it creates only one of these support data items, it produces a sufficient effect. Furthermore, the faulty part may be shown to the user to let the user choose an additional support data item. In addition, only the faulty part may be determined. Specifically, when the fault is not serious, or when the support data is not needed because the user has a manual written to deal with different faulty parts, simply determining the faulty part provides sufficient support.

Ninth Embodiment

Figure 15:
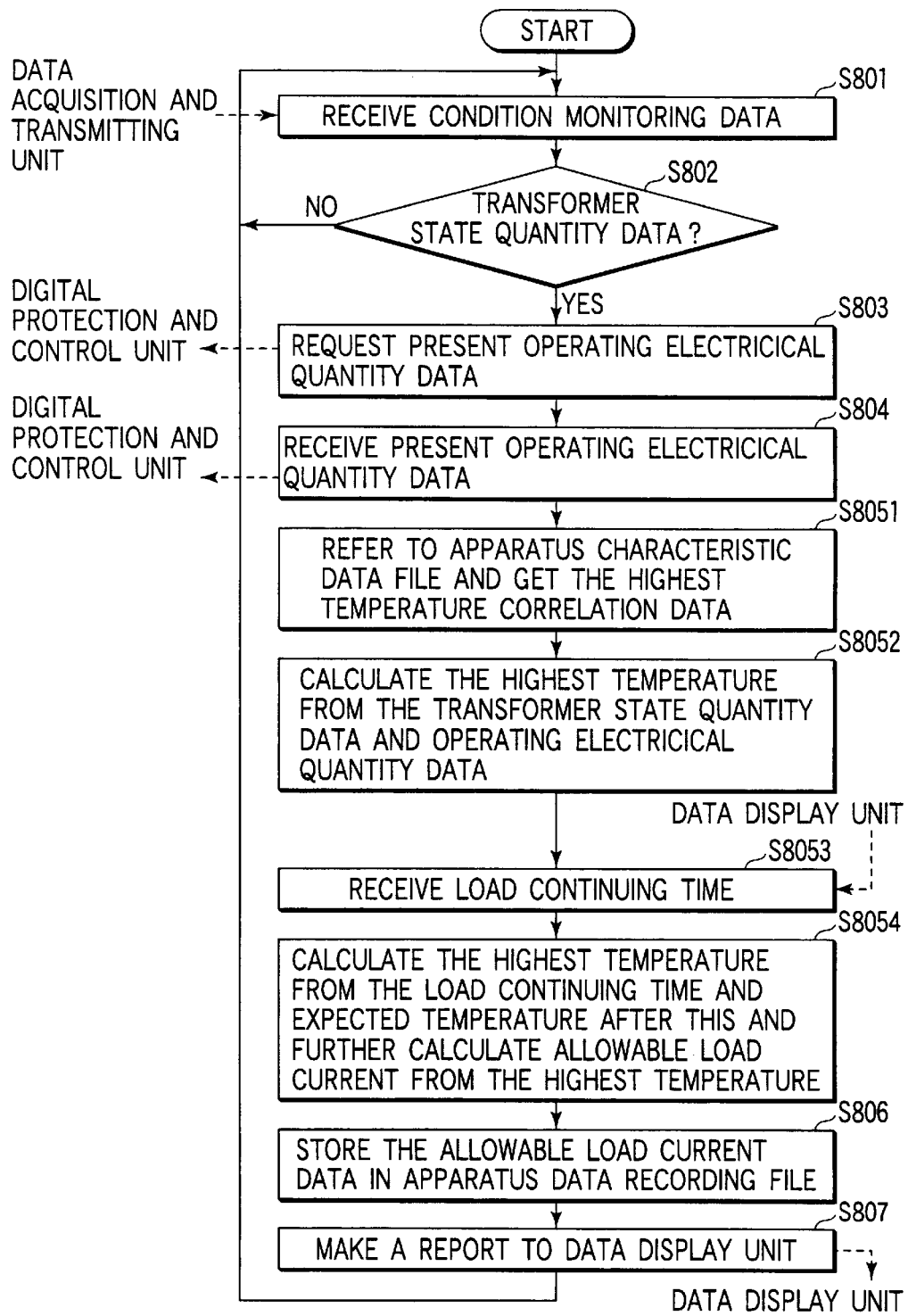
FIG. 15 is a schematic flowchart for an example of the processing of an apparatus monitoring system according to a ninth embodiment of the present invention.

FIG. 15 is a flowchart showing an outline of the procedure for processing in a ninth embodiment of the present invention.

An apparatus monitoring system according to the ninth embodiment is such that, in the configuration of the seventh embodiment of FIG. 9, the apparatus-data server 9 does calculations to estimate a temporary allowable load on the apparatus using the condition monitoring data S(t) from the data acquisition and transmitting unit 1, the electrical quantity data E(t) from the digital protection and control unit 2, and the data in the apparatus characteristic data file 94.

The apparatus monitoring system of the ninth embodiment with the above configuration can estimate a temporary allowable load on the monitored apparatus U. Using a case where the monitored apparatus U is a transformer, the process of doing calculations to estimate an allowable load on the apparatus in the ninth embodiment will be explained.

The insulating material of a transformer deteriorates gradually during operation because of humidity, temperature, and oxygen. As the deterioration gets worse, the possibility that the insulating material will break down increases, when an abnormal voltage caused by, for example, external lightning or internal surge, or an electrical or mechanical abnormal stress, such as electromagnetic mechanical force, caused by external short-circuiting is applied to the insulating material. The time from when a transformer starts to operate until when its insulating material will break down is called the service life of the transformer. It is generally said that the service life of the transformer is determined by its maximum temperature in oil. That is, how much service life has been spent can be calculated from its maximum temperature and its elapsed time.

The maximum temperature point in the transformer appears at the windings and this temperature cannot be measured directly. Although the maximum temperature of the windings depends on the shape of the windings, the shape and layout of the winding support spacer, and others, it can be calculated from the values that can be measured by sensors, such as the winding average temperature, atmospheric temperature, or load current.

In the apparatus monitoring system of the ninth embodiment, the apparatus-data server 9 of FIG. 9 carries out a series of processes shown in FIG. 15, thereby calculating an allowable load and time that cause no damage to the service life of the transformer, which enables the transformer to be operated efficiently. Referring to the flowchart of FIG. 15, the process of doing calculation to estimate an allowable load will be explained. In the ninth embodiment, explanation will be given about a case where the time during which a over load operation is be continued from this time on is inputted to present an allowable load current value during the period of time.

First, at step 801, the apparatus-data server 9 receives the condition monitoring data S(t) sent from the data acquisition and transmitting unit 1 at specific intervals of time. At step 802, if having judged that the data received in the reception process at step 801 is the transformer state quantity data, the apparatus-data server 9 passes control to step 803, where it requests the present apparatus operating electrical quantity data from the digital protection and control unit 2. At step 804, the server 9 receives the transformer's electrical quantity data E.(t) sent from the digital protection and control unit 2. Specifically, the server 9 receives the atmospheric temperature, oil temperature, and winding temperature data as the condition monitoring data and the load current data as the operating electrical quantity data.

Next, at step 8051, the apparatus-data server 9 refers to the apparatus characteristic data file 94 and gets the maximum temperature correlation data indicating the correlation between the maximum temperature of the transformer and the atmospheric temperature, oil temperature, and winding temperature, and the load current. At step 8052, the server 9 calculates the maximum temperature inside the transformer using the atmospheric temperature, oil temperature, and winding temperature data received at step 801 and the load current data received at step 804.

At step 8053, the server 9 receives the time during which a over load is expected to continue and the over load continuing time from the data display unit 3. At step 8054, the server 9 calculates the maximum temperature from the over load continuing time received at step 8053 and the atmospheric temperature expected from this time on and, on the basis of the result of the calculation, further calculates the allowable load current. At step 806, the server 9 stores the allowable load current data in the apparatus-data recording file 93. At step 807, the server 9 makes a report to the data display unit 3.

Receiving the report, the data display unit 3 refers to the apparatus-data recording file in the apparatus-data server via the communication network 4, which enables the detailed allowable load data to be checked.

Such a series of processes enables the user to check a temporary allowable load on the transformer, the monitored apparatus, easily on the data display unit 3. Therefore, the ninth embodiment makes the function of the apparatus monitoring system much more sophisticated and enables efficient operation of the monitored apparatus, which improves the economy of the whole system including the monitored apparatus.

Furthermore, in the apparatus monitoring system of the ninth embodiment, since the apparatus-data server 9 calculates the maximum temperature on the basis of the maximum temperature correlation data inherent to the apparatus, it can calculate an allowable load accurately for various transformers differing in configuration. Providing the calculated allowable load for the user enables the user to improve the operating efficiency. Since the user need not analyze various types of data about the deterioration of the function of the transformer or manage the apparatus database necessary for such data analysis, the burden of controlling the operating efficiency on the user is decreased.

Moreover, the ninth embodiment manages the maximum temperature correlation data, the maker's know-how, with the apparatus-data server 9 and provides the data for limited users, which makes it possible to realize a highly practical business model making use of technical knowledge.

In the apparatus monitoring system of the ninth embodiment, an allowable load is estimated by inputting a over load continuing time. The present invention is not limited to this. For instance, as a modification of the ninth embodiment, an allowable over load continuing time may be estimated by inputting the desired load quantity. Alternatively, the inspection timing may be estimated by calculating the accumulated service life loss of the transformer.

Tenth Embodiment

Figure 16:
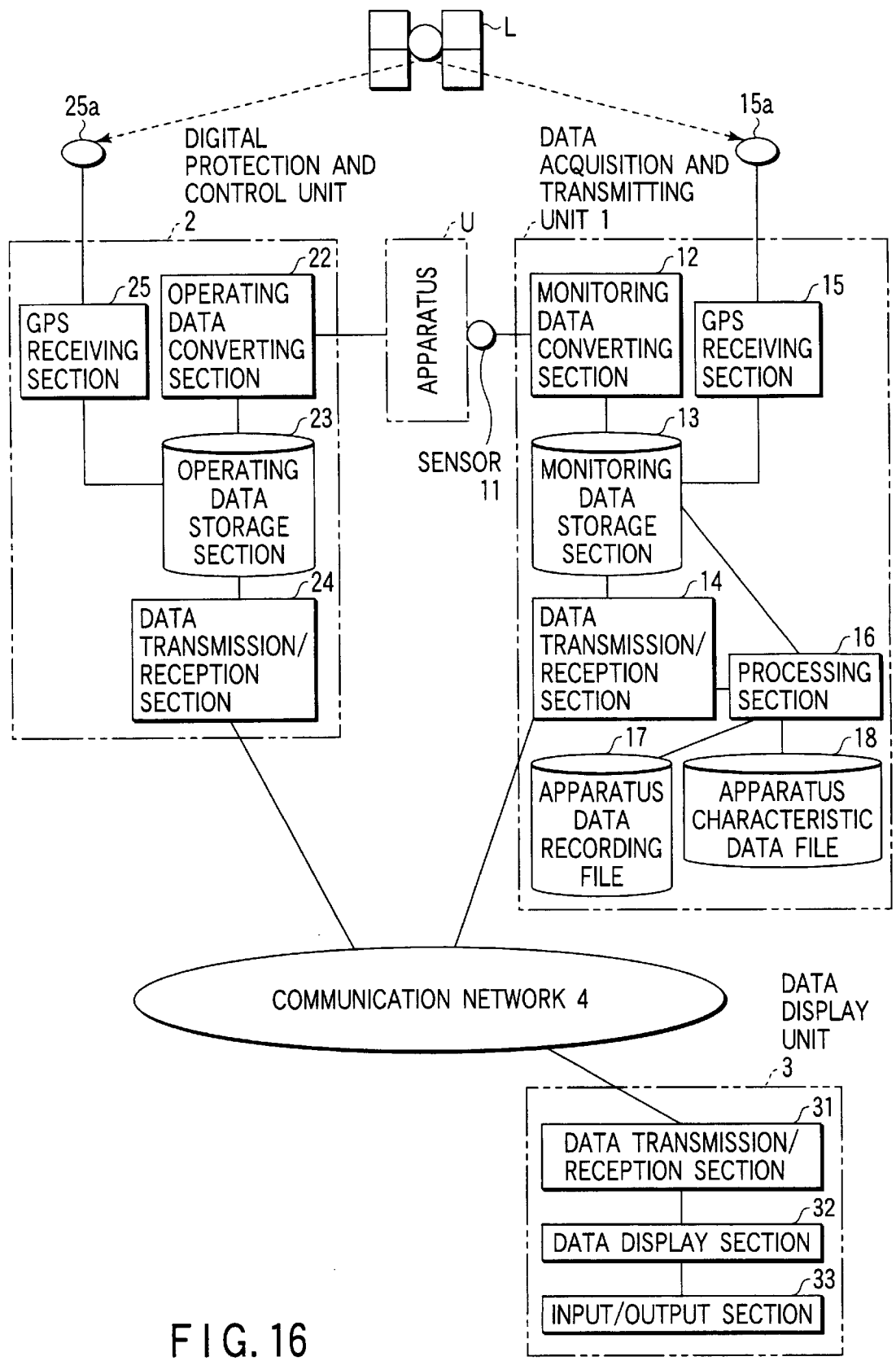
FIG. 16 is a block diagram showing the configuration of a data acquisition and transmitting unit in an apparatus monitoring system according to a tenth embodiment of the present invention.

FIG. 16 is a block diagram showing the configuration of a data acquisition and transmitting unit in an apparatus monitoring system according to a tenth embodiment of the present invention.

As shown in FIG. 16, the apparatus monitoring system is such that the apparatus-data server 7 is eliminated in the apparatus monitoring system of the seventh embodiment by modifying the configuration of the data acquisition and transmitting unit 1.

Specifically, in the tenth embodiment, the data acquisition and transmitting unit 1 is provided with a processing section 16, an apparatus-data recording file 17, and an apparatus characteristic data file 18 as well as the monitoring data converting section 12, monitoring data storage section 13, data transmission/reception section 14, and GPS receiving section 15. The data transmission/reception section 14 is designed to receive the absolute-time-tagged electrical quantity data E(t) and operating state data P(t) sent from the digital protection and control unit 2 via the communication network 4.

The processing section 16 does apparatus monitoring and maintenance support calculations using the absolute-time-tagged condition monitoring data S(t) stored in the monitoring data storage section 13 of the data acquisition and transmitting unit 1, the received absolute-time-tagged electrical quantity data E(t) and operating state data P(t), and the basic performance data and apparatus configuration data in the apparatus characteristic data file 18. Then, the processing section 16 stores the result of the calculations and, if necessary, informs the data display unit 3 of the result. Since the remaining configuration is the same as that of the seventh embodiment, its explanation will be omitted.

Figure 17:
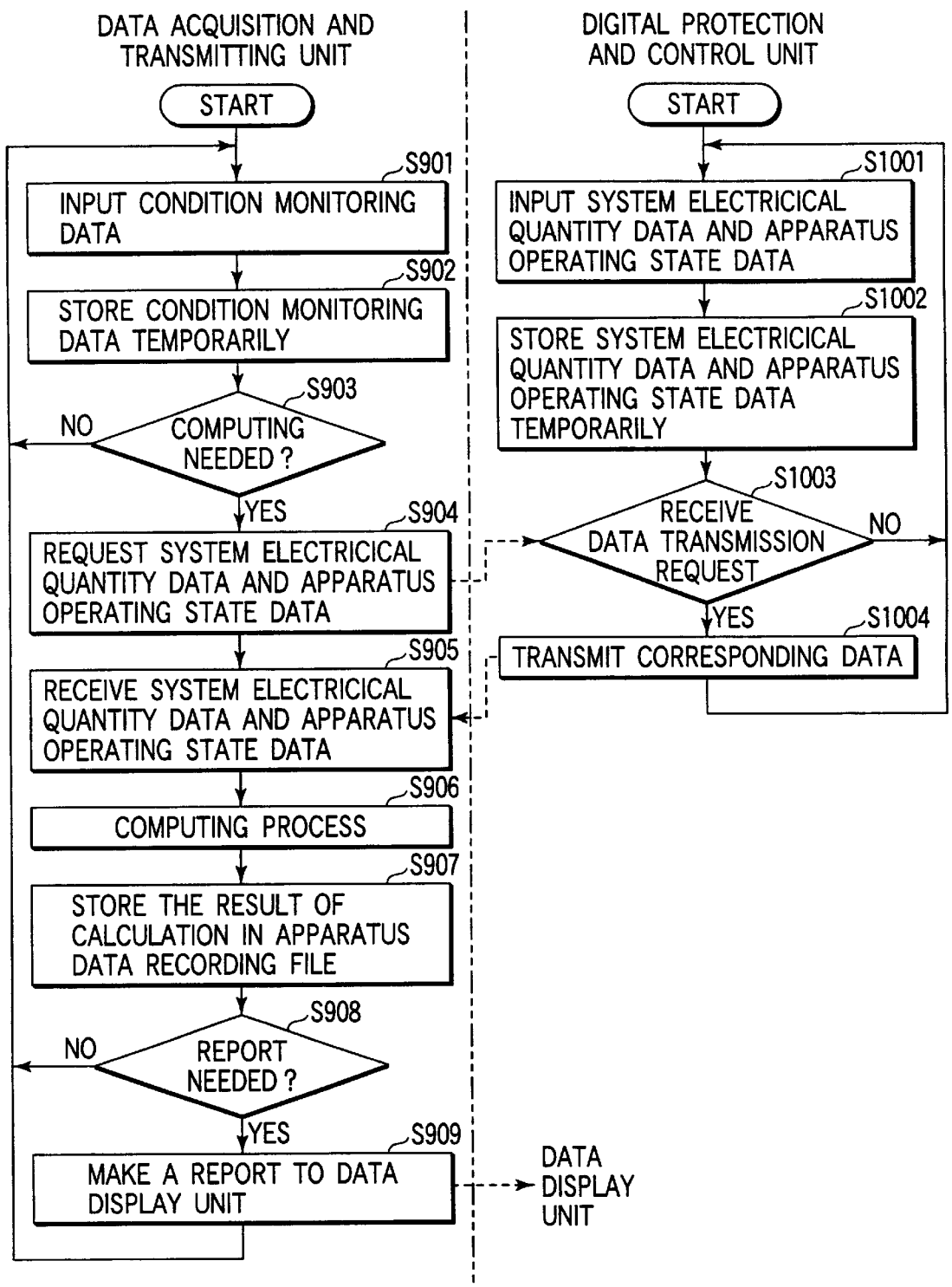
FIG. 17 is a schematic flowchart for an example of the processing of an apparatus monitoring system according to the tenth embodiment.

FIG. 17 is a flowchart giving an outline of the procedure for data processing up to recording the apparatus monitoring and maintenance data at the data acquisition and transmitting unit 1 and digital protection and control unit 2 in the system having the above configuration.

As shown in FIG. 17, in the data acquisition and transmitting unit 1, the condition monitoring data is inputted to the monitoring data converting section 12 at a specific time or each time an operation is carried out (step 901). The time obtained at the GPS receiving section 15 is added to the inputted condition monitoring data. The resulting data is stored temporarily in the monitoring data storage section 13 (step 902).

In parallel with this, the system electrical quantity data and apparatus operating state data are inputted to the operating data converting section 22 in the digital protection and control unit 2 at a specific time or each time an operation is carried out (step 1001). The time obtained at the GPS receiving section 25 is added to these inputted data. The resulting data are stored temporarily in the monitoring data storage section 23 (step 1002).

Next, the data acquisition and transmitting unit 1 judges the condition monitoring data according to a preset condition. If the data acquisition and transmitting unit 1 have judged that it needs a computing process (YES at step 903), the data acquisition and transmitting unit 1 requests the digital protection and control unit 2 to transmit the system electrical quantity data and apparatus operating state data at that time (step 904).

Receiving the data (YES at step 1003), the digital protection and control unit 2 transmits the data stored in the operating data storage section 23 to the data acquisition and transmitting unit 1 (step 1004). The data acquisition and transmitting unit 1 receives the data (step 905), does apparatus monitoring and maintenance calculations using these condition monitoring data, system electrical quantity data, apparatus operating state data, and the data in the apparatus characteristic data file 18 (step 906), and stores the result of the calculations in the apparatus-data recording file 17 (step 907). When the result of the calculations has to be reported to the data display unit 3 (YES at step 908), the transmitting unit 1 informs the data display unit 3 of the result (step 909).

With the apparatus monitoring system of the tenth embodiment, maintenance information, including the inspection timing data of the apparatus, can be stored and managed in the data acquisition and transmitting unit 1 without providing an apparatus-data server.

Therefore, the tenth embodiment not only produces the effect of the seventh embodiment but also simplifies the system configuration and improves the economy of the system.

The present invention is not limited to the above-described embodiments and may be practiced or embodied in still other ways without departing from the spirit or essential character thereof.

While in the fifth and eighth embodiments, the determination of the faulty part has been explained using the case where the faulty part is determined in detail in the fault occurring gas section, the way of determining the faulty part in the invention is not limited to this. For instance, the invention may be applied to determining the partial discharge occurring part, which produces an excellent effect. In the ninth embodiment, an estimated value of the transformer allowable load has been calculated as the estimated value of the variable related to the service life of the monitored apparatus.

The present invention is not restricted to these embodiments. The invention can further estimate the transformer allowable over load continuing time as a variable related to the service life of the monitored apparatus. Moreover, it can determine an estimated value for the elapsed service life of the transformer and find the transformer inspection timing according to the estimated value.

In each of the above embodiment, the apparatus-data server 9 or data acquisition and transmitting unit 1 has received various data, this invention is not limited to this. For instance, as a modification of each embodiment, an agent program may acquire the necessary data, moving from one unit to another, and subject the acquired data to calculations, and then display the result of the calculations at each unit or transmit the result to the network. This configuration produces a similar effect to that of each embodiment.

As described above, with the present invention, the data acquisition and transmitting unit for acquiring the data from the sensors provided on the monitored apparatus and the data display unit for displaying the acquired data are connected via the communication network, enabling the condition monitoring data to be checked anywhere, which improves the function of the system. Therefore, it is possible to provide a highly economical, and high-performance apparatus monitoring system which helps save labor in maintaining the apparatus and take action more easily and quickly in case of a failure and improves the operation of the apparatus and system and further the economy of the whole facilities.

The acquisition of the absolute time enables the condition monitoring data obtained in the system to be compared with the data measured by another system in the same time sequence, improving the data management and further the function of the system. Therefore, it is possible to provide a higher-performance apparatus monitoring system which helps take action much easier and faster in case of a failure.

Taking in the data from the digital protection and control unit via the communication network makes it possible to simplify the system as much as possible and make a sophisticated judgment on the state of the apparatus. Therefore, it is possible to provide a highly economical, high-performance apparatus monitoring system.

Furthermore, with the present invention, various data items necessary for data analysis, including the general basic performance data about the apparatus and the electrical power installation configuration data have been stored beforehand. Therefore, it is possible to provide a business model for an apparatus monitoring method capable of monitoring apparatuses installed the user's electric power installation, creating some useful consulting data from the monitoring data at the time of maintenance service or in case of a fault, and providing the user with the consulting data.

The entire disclosure of Japanese Patent Application No. 2000-151431 filed on May 23, 2000 including specification, claims, drawings and summary are incorporated herein by reference in its entirety.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus monitoring system which monitors an apparatus installed in an electric power installation and is connected to a communication network, said apparatus monitoring system comprising:

sensors, provided on said apparatus, for measuring said apparatus to output monitoring signals that vary according to the state of each part of the apparatus;

a data acquisition and transmitting unit including conversion means which receives the absolute time, to which said sensors supply the monitoring signals, which samples the monitoring signals and converts the sampled signals into absolute-time-tagged digital monitoring data and transmission means for transmitting the digital monitoring data to the communication network; and a data display unit which receives the digital data from said data acquisition and transmitting unit via said communication network, converts the digital data into display data related to the state of said monitored apparatus, and displays the display data.

2. The apparatus monitoring system according to claim 1, wherein said apparatus to be monitored is a power supply control apparatus for controlling power supply in an electric power transmission system, said apparatus monitoring system further comprises a digital protection and control unit including means for sampling the electrical quantity data about the system controlled by said power supply control apparatus and the operating state data about the power supply control apparatus and converting the sampled data into absolute-time-tagged digital data, protection and control means for protecting and controlling the system according to the digital data, and transmission means for transmitting the digital data as electrical quantity data and operating state data to said communication network, and said data display unit receives the digital data from said data acquisition and transmitting unit and the digital data from said digital protection and control unit via said network, converts the digital data into display data related to the state of said monitored apparatus, and displays the display data.

3. The apparatus monitoring system according to claim 1, wherein said communication network is composed of a first communication network for a local area constructed in each electric power installation and a second communication network for connecting a plurality of electric power installations in a wide area.

4. The apparatus monitoring system according to claim 3, wherein said data acquisition and transmitting unit is connected to said first communication network by means of the ones selected from the wires including the unused wires and power-supply wires in the electric cables.

5. The apparatus monitoring system according to claim 1, wherein one of said data acquisition and transmitting unit and said data display unit determines the part where an abnormality has occurred in said apparatus on the basis the condition monitoring data from the data acquisition and transmitting unit and creates support data according to the determined faulty part.

6. The apparatus monitoring system according to claim 2, wherein one of said data acquisition and transmitting unit, said digital protection and control unit, and said data display unit determines the part where an abnormality has occurred in said apparatus on the basis of one of or both of the condition monitoring data from the data acquisition and transmitting unit and the operating state data from the digital protection and control unit and creates support data according to the determined faulty part.

7. The apparatus monitoring system according to claim 6, wherein said apparatus to be monitored has a plurality of gas sections, and
the faulty part to be determined includes a gas section where a fault is expected to occur and a part where partial discharge it expected to occur.

8. The apparatus monitoring system according to claim 2, wherein one of said data acquisition and transmitting unit, said digital protection and control unit, and said data display unit includes means for calculating an estimated value for a variable related to the continuing deterioration of the function of each part of said apparatus on the basis of one of or both of the apparatus monitoring data from the data acquisition and transmitting unit and the operating state data from the digital protection and control unit and the absolute-time-tagged electrical quantity data from the digital protection and control unit and creating estimated data according to the calculated estimated value.

9. The apparatus monitoring system according to claim 8, wherein one part of said apparatus corresponds to one of a switch contact, a tap selector contact, and a transformer, and
one variable related to said deterioration of the function corresponds to one of the amount of wear of a switch contact, the amount of wear of a OLTC contact, an allowable load on a transformer, the period of time during which an allowable over load can be applied continuously on a transformer, and the service life of a transformer.

10. A method of monitoring the state of an apparatus installed in a user's electric power installation and creating necessary data, said apparatus with sensors for measuring monitoring signals of the apparatus state, and said electric power installation being provided with a data acquisition and transmitting unit including conversion means which receives the absolute time, to which said sensors supply the monitoring signals, which samples the monitoring signals and converts the sampled signals into absolute-time-tagged digital monitoring data and transmission means for transmitting the digital monitoring data to a communication network, said method comprising:
the step of prompting the user to enter information for identifying the performance including the ratings of the apparatus via said acquisition and transmitting unit and receiving identification information;
the step of prompting the user to transmit monitoring data about the apparatus via said acquisition transmitting unit and receiving the monitoring data;
the step of prompting the user to transmit the electrical quantity data about the system controlled by said apparatus via said acquisition transmitting unit and receiving the electrical quantity data; and
the step of obtaining the basic performance data about said monitored apparatus by reference to an apparatus database on the basis of said performance identification information, calculating an estimated value for a variable related to the deterioration of the function of the monitored apparatus on the basis of the basic performance data, said received condition monitoring data, and electrical quantity data, and creating estimated data according to the obtained estimated value.

11. The method according to claim 10, wherein the step of creating said estimated data includes
the step of, on the basis of said obtained basic performance data for said apparatus and said received electrical quantity data, calculating, as said estimated value, the accumulated value for the one selected according the apparatus from the amount of wear of a switch contact, the amount of ware of a OLTC contact on its electrode, and the service life of a transformer, and
the step of creating expected inspection timing data about said monitored apparatus on the basis of said calculated accumulated value and said obtained basic performance data.

12. A method of monitoring the state of an apparatus installed in a user's electric power installation and creating necessary data, said apparatus to be monitored which is a power supply control apparatus for controlling power supply in an electric power transmission system and which includes means for sampling electrical quantity data about the system controlled by said power supply control apparatus and operating state data about the power supply control apparatus and converting the sampled data into absolute-time-tagged digital data, protection and control means for protecting and controlling the system according to the digital data, and transmission means for transmitting the digital data as electrical quantity data and operating state data to said communication network, said method comprising:
the step of prompting the user to enter information for identifying the performance including the ratings of the apparatus via said transmission means and receiving identification information;
the step of prompting the user to transmit electrical quantity data and operating state data about the apparatus via said transmission means and receiving monitoring data; and
the step of obtaining the basic performance data about said apparatus by reference to an apparatus database on the basis of said performance identification information, determining an faulty part of the monitored apparatus on the basis of the basic performance data and said received operating state data, and creating support data according to the determined faulty part.

13. The method according to claim 12, wherein the step of creating said support data includes
the step of determining the part where an abnormality has occurred in said monitored apparatus on the basis of said obtained basic performance data and said received operating state data, and
the step of, on the basis of said obtained basic performance data and said determined faulty part, creating support data indicating one of whether to continue the operation, the procedure for restoration, and the cause of the abnormality.

14. A program for executing a method of monitoring the state of an apparatus installed in a user's electric power installation and creating necessary data, said apparatus being provided with sensors for outputting monitoring signals of the apparatus state, and said electric power installation being provided with a data acquisition and transmitting unit including conversion means which receives the absolute time, to which said sensors supply the monitoring signals, which samples the monitoring signals and converts the sampled signals into absolute-time-tagged digital monitoring data and transmission means for transmitting the digital monitoring data to a communication network, said program comprising:

receiving information for identifying the performance including the ratings of the apparatus via said acquisition transmitting unit;

receiving monitoring data about the apparatus via said acquisition transmitting unit;

receiving electrical quantity data about the system controlled by said apparatus via said acquisition transmitting unit; and obtaining the basic performance data about said monitored apparatus by reference to an apparatus database on the basis of said performance identification information, calculating an estimated value for a variable related to the deterioration of the function of the monitored apparatus on the basis of the basic performance data, said received condition monitoring data, and electrical quantity data, and creating estimated data according to the obtained estimated value.

15. The program according to claim 14, wherein creating said estimated data includes calculating, as said estimated value, the accumulated value for the one selected according the apparatus from the amount of wear of a switch contact, the amount of ware of a OLTC contact on its electrode, and the service life of a transformer, on the basis of said obtained basic performance data and said received electrical quantity data for said apparatus, and creating expected inspection timing data about said monitored apparatus on the basis of said calculated accumulated value and said obtained basic performance data.

16. A program for executing a method of monitoring the state of an apparatus installed in a user's electric power installation and creating necessary data, said apparatus to be monitored which is a power supply control apparatus for controlling power supply in an electric power transmission system and which includes means for sampling electrical quantity data about the system controlled by said power supply control apparatus and operating state data about the power supply control apparatus and converting the sampled data into absolute-time-tagged digital data, protection and control means for protecting and controlling the system according to the digital data, and transmission means for transmitting the digital data as electrical quantity data and operating state data to said communication network, said program comprising:

receiving information for identifying the performance including the ratings of the apparatus via said transmission means;

receiving electrical quantity data and operating state data about the apparatus via said transmission means; and obtaining the basic performance data about said apparatus by reference to an apparatus database on the basis of said performance identification information, determining an faulty part of the monitored apparatus on the basis of the basic performance data and said received operating state data, and creating support data according to the determined faulty part.

17. The method according to claim 16, wherein creating said support data includes determining the part where an abnormality has occurred in said monitored apparatus on the basis of said obtained basic performance data and said received operating state data, and creating support data indicating one of whether to continue the operation, the procedure for restoration, and the cause of the abnormality on the basis of said obtained basic performance data and said determined faulty part.

* * * * *